(12) United States Patent
Kimura et al.

(10) Patent No.: US 8,794,839 B2
(45) Date of Patent: Aug. 5, 2014

(54) BEARING APPARATUS, SPINDLE MOTOR, AND DISK DRIVE APPARATUS

(75) Inventors: Akihiro Kimura, Kyoto (JP); Teiichi Hirono, Kyoto (JP); Kunio Sakurada, Kyoto (JP); Kyoko Horise, Kyoto (JP); Takehito Tamaoka, Kyoto (JP); Kazuhiro Sato, Kyoto (JP); Yoichi Sekii, Kyoto (JP)

(73) Assignee: Nidec Corporation, Kyoto (JP)

( * ) Notice: Subject to any disclaimer, the term of this patent is extended or adjusted under 35 U.S.C. 154(b) by 53 days.

(21) Appl. No.: 13/602,348

(22) Filed: Sep. 4, 2012

(65) Prior Publication Data

US 2012/0326543 A1    Dec. 27, 2012

Related U.S. Application Data

(63) Continuation-in-part of application No. 12/791,147, filed on Jun. 1, 2010, now Pat. No. 8,277,125.

(30) Foreign Application Priority Data

Jun. 12, 2009  (JP) .................................. 2009-141192
Aug. 7, 2012   (JP) .................................. 2012-174569

(51) Int. Cl.
*F16C 32/06* (2006.01)

(52) U.S. Cl.
USPC ......................................................... 384/119

(58) Field of Classification Search
CPC .... F16C 17/102; F16C 17/107; F16C 33/741; F16C 33/743; G11B 19/2036
USPC ............ 384/100, 107, 119, 130, 132; 310/90; 360/99.08, 98.07
See application file for complete search history.

(56) References Cited

U.S. PATENT DOCUMENTS 5,533,811 A    7/1996  Polch et al.
5,558,443 A    9/1996  Zang
(Continued)

FOREIGN PATENT DOCUMENTS

JP    06-28335 U    4/1994
JP    06-121484 A   4/1994
(Continued)

OTHER PUBLICATIONS

Kimura et al., "Dynamic Pressure Bearing and Spindle Motor Using the Same", U.S. Appl. No. 12/952,223, filed Nov. 23, 2010.

(Continued)

*Primary Examiner* — Thomas R Hannon
(74) *Attorney, Agent, or Firm* — Keating & Bennett, LLP

(57) ABSTRACT

A bearing apparatus includes a stationary shaft, a first annular member, and a rotating member. The rotating member includes a first inner circumferential surface arranged opposite to the outer circumferential surface of the stationary shaft, and a second inner circumferential surface arranged opposite to an outer circumferential surface of the first annular member. A lubricating oil is arranged in a gap between a surface of a stationary member and the rotating member. On an upper side of an upper surface of the lubricating oil, the first annular member and the rotating member are arranged radially opposite to each other with a slight gap defined therebetween, so that a labyrinth seal is defined. The labyrinth seal and a fixing range over which the stationary shaft and the first annular member are fixed to each other are arranged to overlap with each other in a radial direction.

31 Claims, 16 Drawing Sheets

(56) References Cited

U.S. PATENT DOCUMENTS

| | | | |
|---|---|---|---|
| 5,880,545 A | 3/1999 | Takemura et al. | |
| 6,211,592 B1 | 4/2001 | Ichiyama | |
| 6,246,136 B1 | 6/2001 | Ichiyama | |
| 6,991,376 B2 | 1/2006 | Aiello et al. | |
| 7,982,349 B2 * | 7/2011 | Popov et al. | 310/90 |
| 8,385,017 B2 * | 2/2013 | Mizukami et al. | 360/99.08 |
| 2004/0090702 A1 | 5/2004 | Aiello et al. | |
| 2004/0096131 A1 | 5/2004 | Aiello et al. | |
| 2004/0156568 A1 | 8/2004 | Woldemar et al. | |
| 2004/0165797 A1 | 8/2004 | Oku et al. | |
| 2004/0175062 A1 | 9/2004 | Nishimura et al. | |
| 2005/0031237 A1 | 2/2005 | Gomyo et al. | |
| 2005/0111769 A1 | 5/2005 | Haga | |
| 2005/0225187 A1 | 10/2005 | Hafen et al. | |
| 2006/0002638 A1 | 1/2006 | Ichiyama | |
| 2006/0002641 A1 | 1/2006 | Ichiyama | |
| 2006/0039634 A1 | 2/2006 | Ichiyama | |
| 2006/0039636 A1 | 2/2006 | Ichiyama | |
| 2006/0051001 A1 | 3/2006 | Nishimura et al. | |
| 2006/0182374 A1 | 8/2006 | Schwamberger et al. | |
| 2006/0210205 A1 | 9/2006 | Engesser et al. | |
| 2006/0222276 A1 | 10/2006 | Uenosono | |
| 2007/0030591 A1 | 2/2007 | Engesser et al. | |
| 2007/0133911 A1 | 6/2007 | Nishimoto et al. | |
| 2007/0140606 A1 | 6/2007 | Feng et al. | |
| 2007/0154123 A1 | 7/2007 | Gomyo et al. | |
| 2007/0177832 A1 | 8/2007 | Gotoh et al. | |
| 2007/0211971 A1 | 9/2007 | Obara et al. | |
| 2008/0006332 A1 | 1/2008 | Ishizawa et al. | |
| 2008/0056104 A1 | 3/2008 | Nishimura et al. | |
| 2008/0187257 A1 | 8/2008 | Engesser et al. | |
| 2008/0292228 A1 | 11/2008 | Yamashita et al. | |
| 2009/0129710 A1 | 5/2009 | Ito et al. | |
| 2009/0140587 A1 | 6/2009 | Popov et al. | |
| 2009/0140588 A1 | 6/2009 | Drautz et al. | |
| 2009/0279818 A1 | 11/2009 | Le et al. | |
| 2010/0124387 A1 | 5/2010 | Fuss et al. | |
| 2010/0142869 A1 | 6/2010 | Grantz et al. | |
| 2010/0266225 A1 | 10/2010 | Yamashita et al. | |
| 2011/0192210 A1 | 8/2011 | Yamashita et al. | |
| 2012/0033329 A1 * | 2/2012 | Mizukami et al. | 360/99.08 |
| 2013/0099613 A1 * | 4/2013 | Cheong et al. | 310/90 |

FOREIGN PATENT DOCUMENTS

| | | | |
|---|---|---|---|
| JP | 07-336924 A | 12/1995 | |
| JP | 2002-005171 A | 1/2002 | |
| JP | 2003-056555 A | 2/2003 | |
| JP | 2003-061295 A | 2/2003 | |
| JP | 2003-092867 A | 3/2003 | |
| JP | 2003-244886 A | 8/2003 | |
| JP | 2004-173377 A | 6/2004 | |
| JP | 2005-048890 A | 2/2005 | |
| JP | 2006-226388 A | 8/2006 | |
| JP | 2009-041671 A | 2/2009 | |
| JP | 2009-133361 A | 6/2009 | |
| JP | 2011-002024 A | 1/2011 | |
| WO | 2006/120719 A1 | 11/2006 | |

OTHER PUBLICATIONS

Kimura et al., "Bearing Apparatus, Spindle Motor, and Disk Drive Apparatus", U.S. Appl. No. 12/791,147, filed Jun. 1, 2010.

Oe et al., "Bearing Apparatus, Spindle Motor, and Disk Drive Apparatus", U.S. Appl. No. 12/793,851, filed Jun. 4, 2010.

Yamada et al., "Fluid Dynamic Bearing Apparatus Arranged to Discharge Air Bubbles Generated Therein and a Spindle Motor and Disk Drive Apparatus Including the Same", U.S. Appl. No. 12/742,931, filed May 14, 2010.

Yamada et al., "Fluid Dynamic Bearing Apparatus, Spindle Motor, and Disk Drive Apparatus", U.S. Appl. No. 12/899,658, filed Oct. 7, 2010.

Yamada et al., "Fluid Dynamic Bearing Apparatus, Spindle Motor, and Disk Drive Apparatus", U.S. Appl. No. 13/299,542, filed Nov. 18, 2011.

Kimura et al., "Bearing Apparatus, Spindle Motor, and Disk Drive Apparatus", U.S. Appl. No. 13/602,420, filed Sep. 4, 2012.

Kimura et al., "Bearing Apparatus, Spindle Motor, and Disk Drive Apparatus", U.S. Appl. No. 13/681,500, filed Nov. 20, 2012.

Iwasaki et al., "Motor and Disk Drive Apparatus", U.S. Appl. No. 13/613,109, filed Sep. 13, 2012.

Tamaoka et al., "Motor and Disk Drive Apparatus", U.S. Appl. No. 13/613,106, filed Sep. 13, 2012.

Iwasaki et al., "Motor and Disk Drive Apparatus", U.S. Appl. No. 13/613,108, filed Sep. 13, 2012.

Fukushima et al., "Motor and Disk Drive Apparatus", U.S. Appl. No. 13/751,380, filed Jan. 28, 2013.

Sekii et al., "Spindle Motor and Disk Drive Apparatus", U.S. Appl. No. 13/767,205, filed Feb. 14, 2013.

Sekii et al., "Bearing Apparatus, Spindle Motor, and Disk Drive Apparatus", U.S. Appl. No. 13/789,796, filed Mar. 8, 2013.

Sekii et al.; "Bearing Apparatus, Spindle Motor, and Disk Drive Apparatus", U.S. Appl. No. 13/790,089, filed Mar. 8, 2013.

Sato et al., "Spindle Motor and Disk Drive Apparatus", U.S. Appl. No. 13/798,857, filed Mar. 13, 2013.

Sekii et al., "Motor and Disk Drive Apparatus", U.S. Appl. No. 13/886,290, filed May 3, 2013.

Watanabe et al., "Spindle Motor and Disk Drive Apparatus", U.S. Appl. No. 13/898,921, filed May 21, 2013.

Kimura et al., "Bearing Mechanism, Motor, and Disk Drive Apparatus", U.S. Appl. No. 13/775,475, filed Feb. 25, 2013.

Sumiji et al., "Bearing Mechanism, Motor, and Disk Drive Apparatus", U.S. Appl. No. 13/775,467, filed Feb. 25, 2013.

Sumiji et al., "Bearing Mechanism, Motor, and Disk Drive Apparatus", U.S. Appl. No. 13/785,297, filed Mar. 5, 2013.

Mizukami et al., "Spindle Motor Including Fluid Bearing and Storage Disk Drive Including the Same", U.S. Appl. No. 13/198,794, filed Aug. 5, 2011.

Mizukami et al., "Spindle Motor and Storage Disk Drive", U.S. Appl. No. 13/739,402, filed Jan. 11, 2013.

Mizukami et al., "Spindle Motor and Storage Disk Drive", U.S. Appl. No. 13/739,415, Jan. 11, 2013.

Yamamoto et al., "Spindle Motor and Storage Disk Drive", U.S. Appl. No. 13/353,563, filed Jan. 19, 2012.

Mizukami et al., "Spindle Motor Having Dynamic Pressure Fluid for Use in a Storage Disk Drive", U.S. Appl. No. 13/198,793, filed Aug. 5, 2011.

Yamaguchi et al., "Method of Manufactoring Fluid Dynamic Bearing Mechanism, Motor, and Storage Disk Drive", U.S. Appl. No. 13/353,554, filed Jan. 19, 2012.

Mizukami et al., "Spindle Motor and Storage Disk Drive", U.S. Appl. No. 13/198,776, filed Aug. 5, 2011.

Mizukami et al., "Spindle Motor and Storage Disk Drive", U.S. Appl. No. 13/198,784, filed Aug. 5, 2011.

Mizukami et al., "Spindle Motor and Storage Disk Drive", U.S. Appl. No. 13/198,787, filed Aug. 5, 2011.

Tamaoka et al., "Spindle Motor and Storage Disk Drive", U.S. Appl. No. 13/353,557, filed Jan. 19, 2012.

Mizukami et al., "Spindle Motor and Storage Disk Drive", U.S. Appl. No. 13/198,797, filed Aug. 5, 2011.

Mizukami et al., "Motor and Storage Disk Drive", Chinese Patent Application No. 201210021666.6, filed Jan. 31, 2012.

English Translation of Official Communication issued in International Patent Application No. PCT/JP2009/059556, mailed on Jan. 20, 2011.

* cited by examiner

BEARING APPARATUS, SPINDLE MOTOR, AND DISK DRIVE APPARATUS

BACKGROUND OF THE INVENTION

1. Field of the Invention

The present invention relates to a bearing apparatus, a spindle motor, and a disk drive apparatus.

2. Description of the Related Art

Hard disk apparatuses and optical disk apparatuses are typically provided with a spindle motor arranged to rotate a disk or disks about a center axis thereof. The spindle motor includes a stationary portion fixed to a housing of the disk drive apparatus, and a rotating portion arranged to rotate while supporting the disk(s). The spindle motor is arranged to produce a torque centered on the center axis by magnetic flux generated between the stationary and rotating portions, whereby the rotating portion is caused to rotate with respect to the stationary portion.

The stationary and rotating portions of the spindle motor are joined to each other through a bearing apparatus. In recent years, in particular, spindle motors have often been provided with a bearing apparatus in which a lubricating fluid is arranged between the stationary and rotating portions. JP-A 2002-5171, for example, describes an example of such a bearing apparatus using the lubricating fluid. In the bearing apparatus described in JP-A 2002-5171, the lubricating fluid is arranged to fill a gap between a shaft and a sleeve which are rotatably supported with respect to each other.

The bearing apparatus described in JP-A 2002-5171 includes a radial dynamic pressure bearing portion and a pumping action portion. The bearing apparatus having such a structure has a problem in that, when it is desirable to limit the axial dimension of the bearing apparatus, both the axial dimension of the radial dynamic pressure bearing portion and that of the pumping action portion is not sufficient enough to allow both the radial dynamic pressure bearing portion and the pumping action portion to both exhibit a sufficient performance.

In addition, the pumping action portion may sometimes introduce air bubbles into the lubricating fluid when pumping the lubricating fluid. If the air bubbles introduced into the lubricating fluid are accumulated in the vicinity of a thrust dynamic pressure bearing portion or the radial dynamic pressure bearing portion, generation of a dynamic pressure in the lubricating fluid may be hindered. If this happens, a sufficient supporting force may not be obtained between the shaft and the sleeve to allow the bearing apparatus to maintain a sufficient rotation performance.

Conventional hard disk apparatuses and optical disk apparatuses are typically provided with a spindle motor arranged to rotate a disk or disks about a center axis thereof. The spindle motor includes a stationary portion fixed to a housing of the apparatus, and a rotating portion arranged to rotate while supporting the disk(s). The spindle motor is arranged to produce a torque centered on the center axis by magnetic flux generated between the stationary and rotating portions, whereby the rotating portion is caused to rotate with respect to the stationary portion.

The stationary and rotating portions of the spindle motor are joined to each other through a bearing apparatus. In recent years, in particular, spindle motors have often been provided with a bearing apparatus in which a lubricating fluid is arranged between the stationary and rotating portions. JP-A 2002-5171, for example, describes an example of such a bearing apparatus including the lubricating fluid. In the bearing apparatus described in JP-A 2002-5171, the lubricating fluid is arranged to fill a gap between a shaft and a sleeve which are rotatably supported with respect to each other. Meanwhile, JP-A 2009-8200 describes a fluid bearing apparatus having a lubricating fluid arranged therein.

In some bearing apparatuses including the lubricating fluid, a labyrinth seal, i.e., an extremely small gap, is defined between a surface of the lubricating fluid and an exterior space. The labyrinth seal limits entry and exit of a gas between the exterior space and a vicinity of the surface of the lubricating fluid, thereby reducing evaporation of the lubricating fluid.

However, the axial dimension of the bearing apparatus is increased when the labyrinth seal is defined by a rotating member and a shaft of a stationary portion. Moreover, when a reduction in the axial dimension of the bearing apparatus is to be achieved with the labyrinth seal defined by the rotating member and the shaft, each of the labyrinth seal and a fixing range over which the shaft and another member are fixed to each other needs to be shortened in an axial direction. This makes it difficult to improve the strength with which the shaft and the other member are fixed to each other and performance of the labyrinth seal.

SUMMARY OF THE INVENTION

According to a preferred embodiment of the present invention, a bearing apparatus includes a stationary member including a stationary shaft and a substantially annular first annular member, a rotating member, and a lubricating oil. The stationary shaft is arranged along a center axis extending in a vertical direction. The first annular member is preferably fixed to an outer circumferential surface of the stationary shaft. The rotating member is supported to be rotatable about the center axis around the stationary shaft.

The rotating member preferably includes a first inner circumferential surface and a second inner circumferential surface. The first inner circumferential surface is arranged opposite to the outer circumferential surface of the stationary shaft. The second inner circumferential surface is arranged opposite to an outer circumferential surface of the first annular member.

The lubricating oil is arranged in a gap between a surface of the stationary member and the rotating member. An upper surface of the lubricating oil is preferably located between the first annular member and the second inner circumferential surface of the rotating member.

On an upper side of the upper surface of the lubricating oil, the first annular member and the rotating member are preferably arranged radially opposite each other with a slight gap defined therebetween to together define a labyrinth seal. The labyrinth seal and a fixing range over which the stationary shaft and the first annular member are fixed to each other are preferably arranged to overlap with each other in a radial direction.

According to the above preferred embodiment of the present invention, the labyrinth seal and the fixing range over which the stationary shaft and the first annular member are fixed to each other are preferably arranged to overlap with each other in the radial direction. This enables each of the labyrinth seal and the fixing range over which the stationary shaft and the first annular member are fixed to each other to have a sufficient axial dimension.

Other features, elements, steps, characteristics and advantages of the present invention will become more apparent

DETAILED DESCRIPTION OF THE PREFERRED EMBODIMENTS

Hereinafter, preferred embodiments of the present invention will be described with reference to the accompanying drawings. It is assumed herein that an upward/downward direction (i.e., a vertical direction) is defined along a center axis 9, with a direction in which a cylindrical portion 133b of a first cup portion 133 projects defined as a downward direction. The shape of each member and relative positions of different members will be described based on this assumption. It should be noted, however, that the above definition of the upward/downward direction is simply applied to facilitate the description provided herein, and should not be construed to restrict in any way the orientation of a bearing apparatus, a spindle motor, or a disk drive apparatus according to any preferred embodiment of the present invention when actually installed in a device.

Also note that the phrase "parallel direction" as used herein refers to parallel or substantially parallel directions. Also note that the phrase "perpendicular direction" as used herein refers to perpendicular or substantially perpendicular directions.

Figure 1:
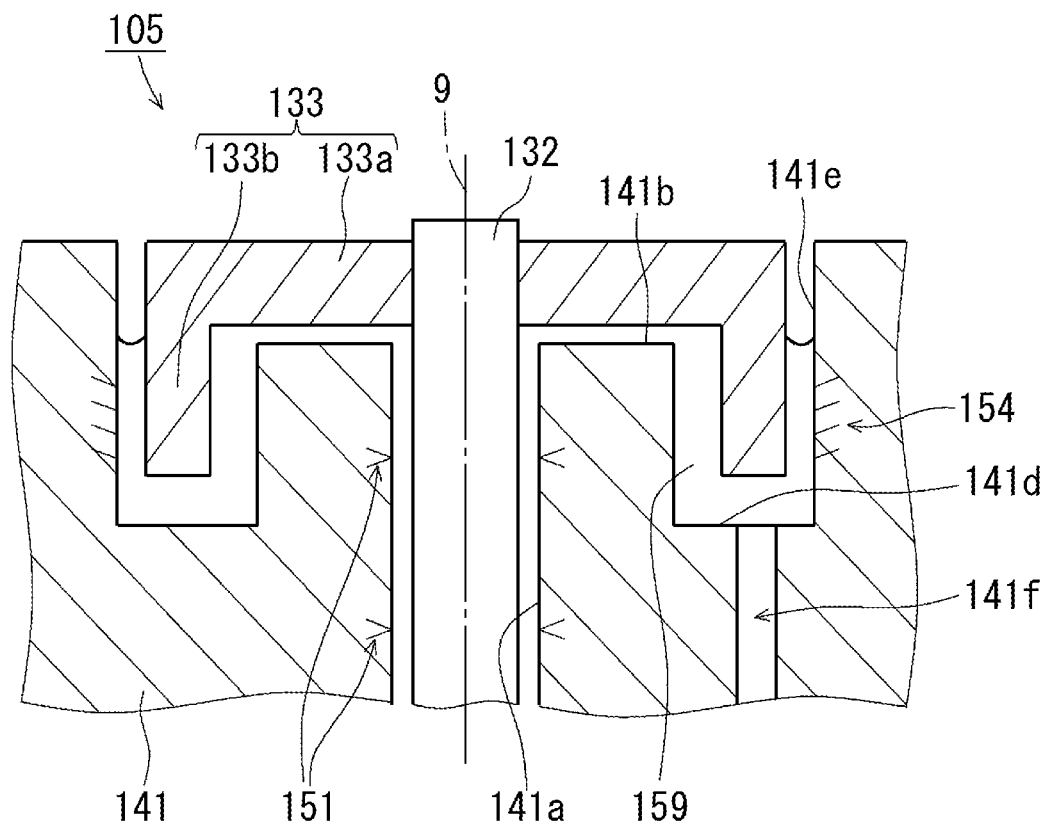
FIG. 1 is a diagram illustrating the structure of a bearing apparatus according to a preferred embodiment of the present invention.

FIG. 1 is a diagram illustrating the structure of a bearing apparatus 105 according to a preferred embodiment of the present invention. Referring to FIG. 1, the bearing apparatus 105 preferably includes a rotating portion 141 and a stationary portion including a stationary shaft 132 and the first cup portion 133. The stationary shaft 132 is arranged along the center axis 9 extending in the vertical direction. The first cup portion 133 includes a circular plate portion 133a and the cylindrical portion 133b. The circular plate portion 133a extends radially outward from the stationary shaft 132. The cylindrical portion 133b projects downward from an outer edge portion of the circular plate portion 133a.

The rotating portion 141 is supported around the stationary shaft 132 so as to be rotatable about the center axis 9. As illustrated in FIG. 1, the rotating portion 141 preferably includes a first inner circumferential surface 141a, a first upper surface 141b, an annular recessed portion 141d, and a second inner circumferential surface 141e. The first inner circumferential surface 141a is arranged opposite to an outer circumferential surface of the stationary shaft 132. The first upper surface 141b is arranged opposite to a lower surface of the circular plate portion 133a of the first cup portion 133. The annular recessed portion 141d is arranged to accommodate at least a lower end portion of the cylindrical portion 133b of the first cup portion 133. The second inner circumferential surface 141e is arranged opposite to an outer circumferential surface of the first cup portion 133.

A lubricating oil 159 is arranged in a gap between the stationary portion and the rotating portion 141. An upper surface of the lubricating oil 159 is located between the outer circumferential surface of the first cup portion 133 and the second inner circumferential surface 141e of the rotating portion 141, whereas a lower surface of the lubricating oil 159 is located between the stationary portion and the rotating portion 141 at a level lower than that of the annular recessed portion 141d.

The rotating portion 141 includes a through hole 141f. One end of the through hole 141f opens into the annular recessed portion 141d, while an opposite end of the through hole 141f opens into the gap between the rotating portion 141 and the stationary portion at a level lower than that of the annular recessed portion 141d. The through hole 141f is filled with the lubricating oil 159.

At least one of the outer circumferential surface of the stationary shaft 132 and the first inner circumferential surface 141a of the rotating portion 141 has a radial dynamic pressure groove array 151 arranged thereon. During rotation of the rotating portion 141, the radial dynamic pressure groove array 151 serves to cause the lubricating oil 159 to flow upward in a gap between the outer circumferential surface of the stationary shaft 132 and the first inner circumferential surface 141a of the rotating portion 141.

At least one of the outer circumferential surface of the first cup portion 133 and the second inner circumferential surface 141e of the rotating portion 141 has a pumping groove array 154 arranged thereon. During the rotation of the rotating portion 141, the pumping groove array 154 serves to cause the lubricating oil 159 to flow toward the lower end portion of the cylindrical portion 133b.

In the present preferred embodiment, the first cup portion 133 includes the cylindrical portion 133b projecting downward while at the same time the rotating portion 141 includes the annular recessed portion 141d arranged to accommodate at least the lower end portion of the cylindrical portion 133b. This arrangement makes it possible to limit the axial dimension of the bearing apparatus 105 as a whole while maintaining a sufficient axial dimension of both the radial dynamic pressure groove array 151 and the pumping groove array 154. Moreover, in the present preferred embodiment, one end of the through hole 141f opens into the annular recessed portion 141d. Accordingly, any air bubbles that have been introduced by the pumping groove array 154 into the lubricating oil 159 will be efficiently sent into the through hole 141f, so that the air bubbles may be discharged out of the bearing apparatus 105 through the lower surface of the lubricating oil 159.

Next, a preferred embodiment of the present invention will be described below in a greater detail.

Figure 2:
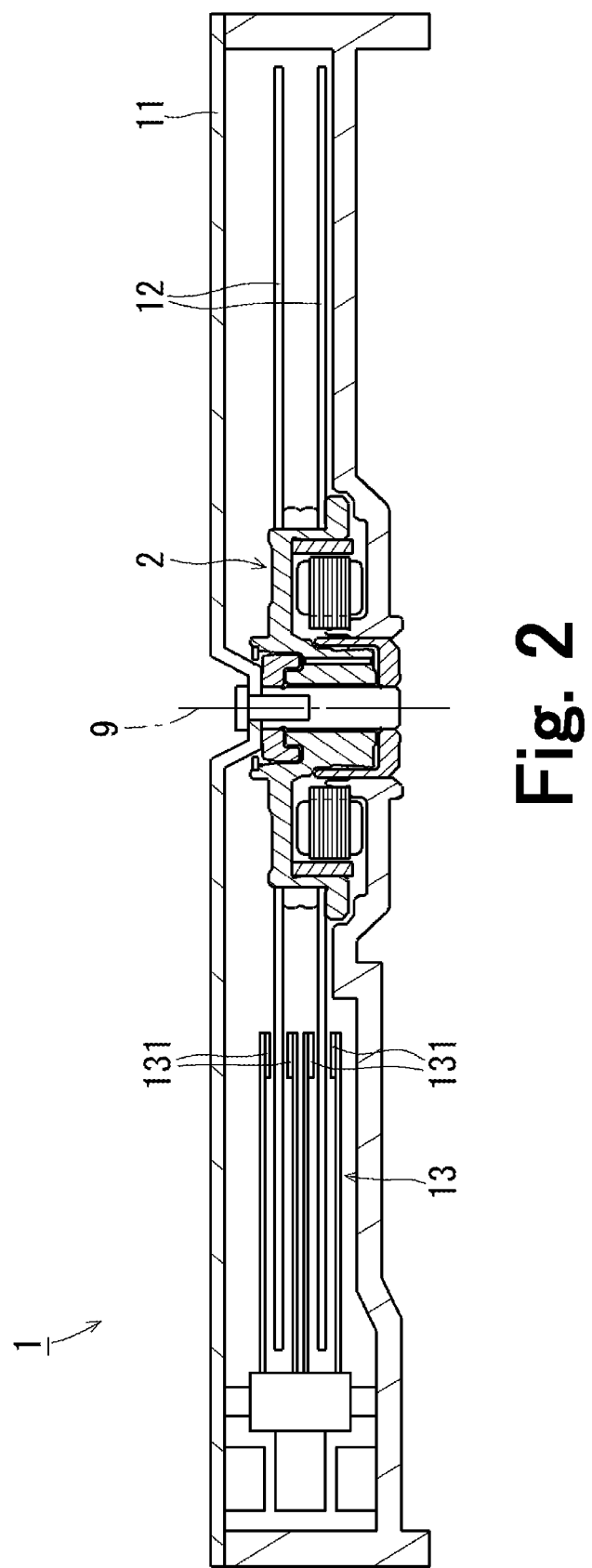
FIG. 2 is a vertical cross-sectional view of a disk drive apparatus according to a preferred embodiment of the present invention.

FIG. 2 is a vertical cross-sectional view of a disk drive apparatus 1 according to a preferred embodiment of the present invention. The disk drive apparatus 1 is a device designed to read and write information from or to magnetic disks 12 (hereinafter referred to simply as "disks" 12) while rotating the disks 12. As illustrated in FIG. 2, the disk drive apparatus 1 preferably includes an apparatus housing 11, two disks 12, an access portion 13, and a spindle motor 2.

The apparatus housing 11 preferably includes the two disks 12, the access portion 13, and the spindle motor 2. The access portion 13 includes heads 131, and is arranged to move any of the heads 131 along a recording surface of an associated one of the disks 12 supported by the spindle motor 2 to read or write information from or to the disk 12. Note that the access portion 13 may be only capable of either reading or writing information from or to any disk 12.

Figure 3:
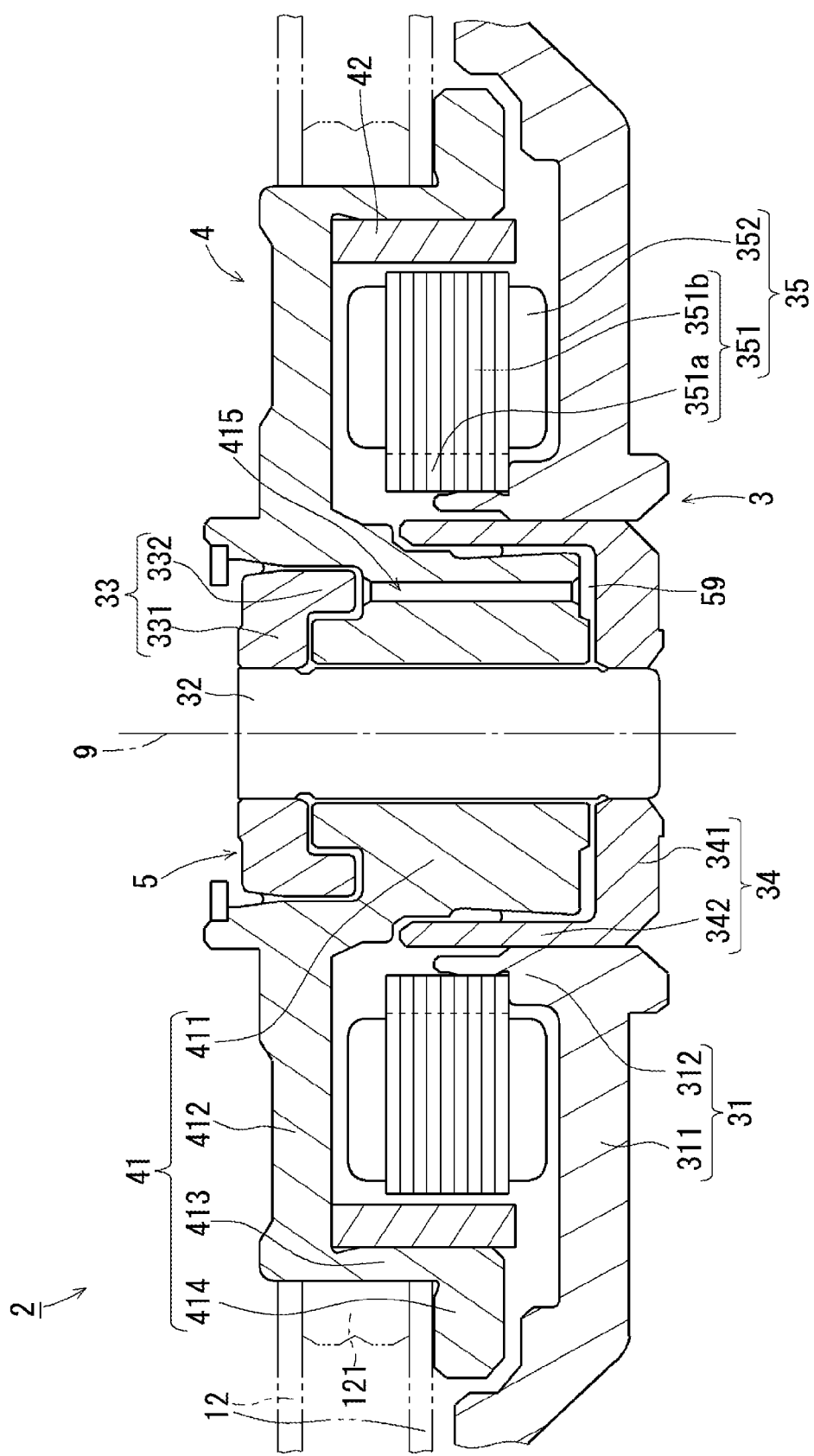
FIG. 3 is a vertical cross-sectional view of a spindle motor according to a preferred embodiment of the present invention.

Next, the structure of the spindle motor 2 will now be described below. FIG. 3 is a vertical cross-sectional view of the spindle motor 2. As illustrated in FIG. 3, the spindle motor 2 includes a stationary portion 3 fixed to the apparatus housing 11 of the disk drive apparatus 1, and a rotating portion 4 arranged to rotate about the center axis 9 while supporting the disks 12.

The stationary portion 3 preferably includes a base member 31, a stationary shaft 32, a first cup portion 33, a second cup portion 34, and a stator unit 35. An upper end portion of the stationary shaft 32 is fixed to a cover member of the apparatus housing 11 (see FIG. 2). On the other hand, a lower end portion of the stationary shaft 32 is fixed in relation to the base member 31 through the second cup portion 34.

The base member 31 defines a portion of the apparatus housing 11 of the disk drive apparatus 1 (see FIG. 2), and is integral with a remaining portion of the apparatus housing 11. Note, however, that in other preferred embodiments the base member 31 and the apparatus housing 11 may be defined by separate members fixed to each other. The base member 31 includes a plate portion 311 extending radially, and a holder portion 312 substantially in the shape of a cylinder and projecting upward from an inner edge portion of the plate portion 311. The base member 31 is made, for example, of a metal such as an aluminum alloy or the like.

The stationary shaft 32 is preferably a substantially columnar member arranged along the center axis 9. The first cup portion 33 is fixed to the stationary shaft 32 in the vicinity of an upper end thereof, while the second cup portion 34 is fixed to the stationary shaft 32 in the vicinity of a lower end thereof. The stationary shaft 32 is made, for example, of a metal such as stainless steel or the like.

The first cup portion 33 is fixed to an outer circumferential surface of the stationary shaft 32. The first cup portion 33 is preferably press-fitted to the stationary shaft 32 in the vicinity of the upper end thereof, and at the same time fixed to the stationary shaft 32 through an adhesive. However, the first cup portion 33 could also be connected to the stationary shaft 32 in any other desirable manner. The first cup portion 33 includes a circular plate portion 331 and a cylindrical portion 332. The circular plate portion 331 is preferably fixed to the outer circumferential surface of the stationary shaft 32, and extends radially outward from the stationary shaft 32. The cylindrical portion 332 preferably projects downward from an outer edge portion of the circular plate portion 331. A vertical section of the first cup portion 33 substantially assumes the shape of the letter "L" with the circular plate portion 331 and the cylindrical portion 332. The first cup portion 33 is preferably made, for example, of a resin, a metal containing copper as a main component, or the like.

The second cup portion 34 is preferably fixed to the outer circumferential surface of the stationary shaft 32 at a level lower than that of the first cup portion 33. The second cup portion 34 is press-fitted to the stationary shaft 32 in the vicinity of the lower end thereof, and at the same time fixed to the stationary shaft 32 through an adhesive. However, the second cup portion 34 could also be connected to the stationary shaft 32 in any other desirable manner. The second cup portion 34 includes a circular plate portion 341 and a cylindrical portion 342. The circular plate portion 341 is preferably fixed to the outer circumferential surface of the stationary shaft 32, and extends radially outward from the stationary shaft 32. The cylindrical portion 342 preferably projects upward from an outer edge portion of the circular plate portion 341. A vertical section of the second cup portion 34 substantially assumes the shape of the letter "L" with the circular plate portion 341 and the cylindrical portion 342. The second cup portion 34 is made, for example, of a resin, a metal containing copper as a main component, or the like.

The second cup portion 34 is fixed to the base member 31 with an outer circumferential surface of the cylindrical portion 342 in contact with an inner circumferential surface of the holder portion 312 of the base member 31. Accordingly, the stationary shaft 32 is indirectly fixed to the base member 31 through the second cup portion 34. Note that in other preferred embodiments the stationary shaft 32 and one or both of the first and second cup portions 33 and 34 may be defined by a single member.

The stator unit 35 includes a stator core 351 and a plurality of coils 352. The stator unit 35 is arranged to generate magnetic flux in accordance with a drive current applied to the coils 352. The stator core 351 preferably includes a ring-shaped core back 351a and a plurality of tooth portions 351b projecting radially outward from the core back 351a. The core back 351a is fixed to an outer circumferential surface of the holder portion 312 of the base member 31. The stator core 351 is obtained, for example, by subjecting magnetic steel sheets laminated in an axial direction to a stamping process. The coils 352 are defined by a lead wire wound about each tooth portion 351b of the stator core 351.

The rotating portion 4 includes a hub 41 and a rotor magnet 42.

The hub 41 is arranged around the stationary shaft 32 to rotate about the center axis 9. The hub 41 preferably includes a sleeve portion 411, a plate portion 412, an outer cylindrical portion 413, and a flange portion 414. The sleeve portion 411 includes an inner circumferential surface arranged opposite to the outer circumferential surface of the stationary shaft 32. With respect to an axial direction, the sleeve portion 411 is arranged between the circular plate portion 331 of the first cup portion 33 and the circular plate portion 341 of the second cup portion 34. The plate portion 412 extends radially outward from an upper end portion of the sleeve portion 411. The outer cylindrical portion 413 extends downward from an outer edge portion of the plate portion 412. The flange portion 414 projects radially outward from a lower end portion of the outer cylindrical portion 413.

An outer circumferential surface of the outer cylindrical portion 413 is arranged in contact with an inner circumferential portion of each of the two disks 12. An upper surface of the flange portion 414 has a lower one of the disks 12 mounted thereon. While the lower disk 12 is mounted on the upper surface of the flange portion 414, an upper one of the disks 12 is preferably mounted on a spacer 121 arranged on the lower disk 12. The inner circumferential portion of each disk 12 is arranged in contact with the outer circumferential surface of the outer cylindrical portion 413, so that the radial position of each disk 12 is determined. The outer cylindrical portion 413 and the flange portion 414 together define a support portion arranged to support the two disks 12 in the above-described manner.

The rotor magnet 42 is fixed to an inner circumferential surface of the outer cylindrical portion 413 of the hub 41. The rotor magnet 42 is in the shape of a ring centered on the center axis 9. An inner circumferential surface of the rotor magnet 42 is arranged radially opposite to outer circumferential surfaces of the tooth portions 351b of the stator core 351. The inner circumferential surface of the rotor magnet 42 defines a pole surface where the north and south poles alternate with each other.

A lubricating oil 59 is arranged in minute gaps that are defined between the stationary shaft 32, the first cup portion 33, the second cup portion 34, and the hub 41. An upper surface of the lubricating oil 59 is located between an outer circumferential surface of the first cup portion 33 and an inner circumferential surface of the plate portion 412 of the hub 41. A lower surface of the lubricating oil 59 is located between an inner circumferential surface of the cylindrical portion 342 of the second cup portion 34 and an outer circumferential surface of the sleeve portion 411 of the hub 41.

The sleeve portion 411 of the hub 41 has a through hole 415 extending in the axial direction from an upper surface to a lower surface thereof defined therein. The through hole 415 is filled with the lubricating oil 59. Examples of the lubricating oil 59 include, for example, oils containing an ester as a main component, such as polyolester oil and diester oil.

The hub 41 is supported through the lubricating oil 59 to be rotatable with respect to the stationary shaft 32 and the first and second cup portions 33 and 34. That is, in the present preferred embodiment, the stationary shaft 32, the first and second cup portions 33 and 34, and the hub 41 preferably together define a fluid dynamic bearing apparatus 5 arranged to join the stationary and rotating portions 3 and 4 to each other such that the stationary and rotating portions 3 and 4 are rotatable relative to each other. The stationary shaft 32 and the first and second cup portions 33 and 34 preferably together define a stationary portion of the fluid dynamic bearing apparatus 5. The hub 41 preferably defines a rotating portion of the fluid dynamic bearing apparatus 5.

Regarding the spindle motor 2 described above, when the drive current is applied to the coils 352 of the stationary portion 3, radial magnetic flux is generated about the tooth portions 351b of the stator core 351. Then, the magnetic flux of the tooth portions 351b and that of the rotor magnet 42 interact with each other to produce a circumferential torque, so that the rotating portion 4 is caused to rotate about the center axis 9 with respect to the stationary portion 3. The disks 12 supported by the hub 41 are also caused to rotate about the center axis 9 along with the hub 41.

Next, the structure of those members which are arranged in contact with the lubricating oil 59 will now be described in greater detail below.

Figure 4:
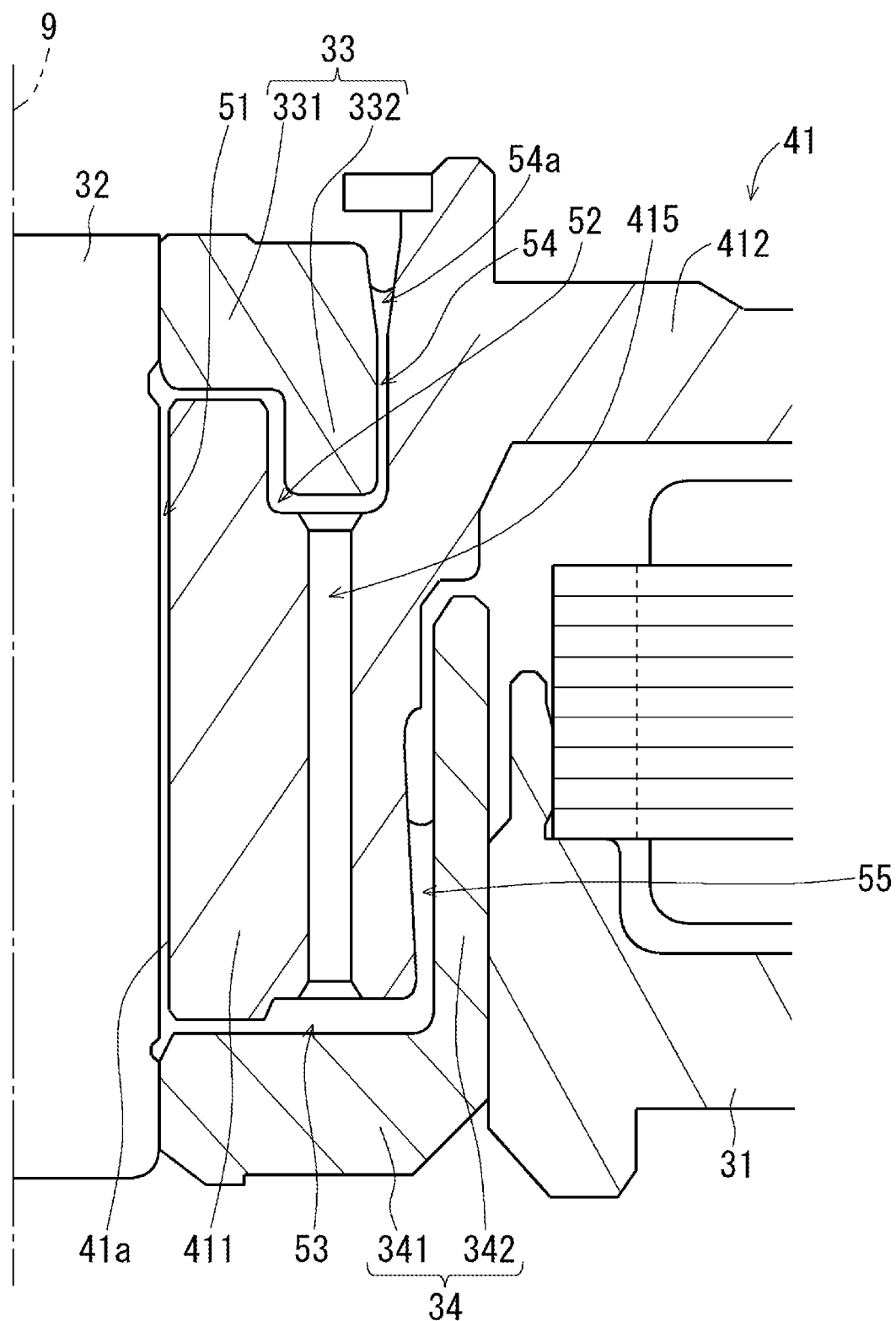
FIG. 4 is a vertical cross-sectional view of a stationary shaft, a first cup portion, a second cup portion, a sleeve portion of a hub, and their vicinity, according to a preferred embodiment of the present invention.

FIG. 4 is a vertical cross-sectional view of the stationary shaft 32, the first and second cup portions 33 and 34, the sleeve portion 411 of the hub 41, and their vicinity. As illustrated in FIG. 4, a gap 51 defined between the outer circumferential surface of the stationary shaft 32 and an inner circumferential surface 41a of the sleeve portion 411, a gap 52 defined between the upper surface of the sleeve portion 411 and a lower surface of the first cup portion 33, a gap 53 defined between the lower surface of the sleeve portion 411 and an upper surface of the circular plate portion 341 of the second cup portion 34, and the through hole 415 define mutually communicating spaces filled with the lubricating oil 59.

Figure 5:
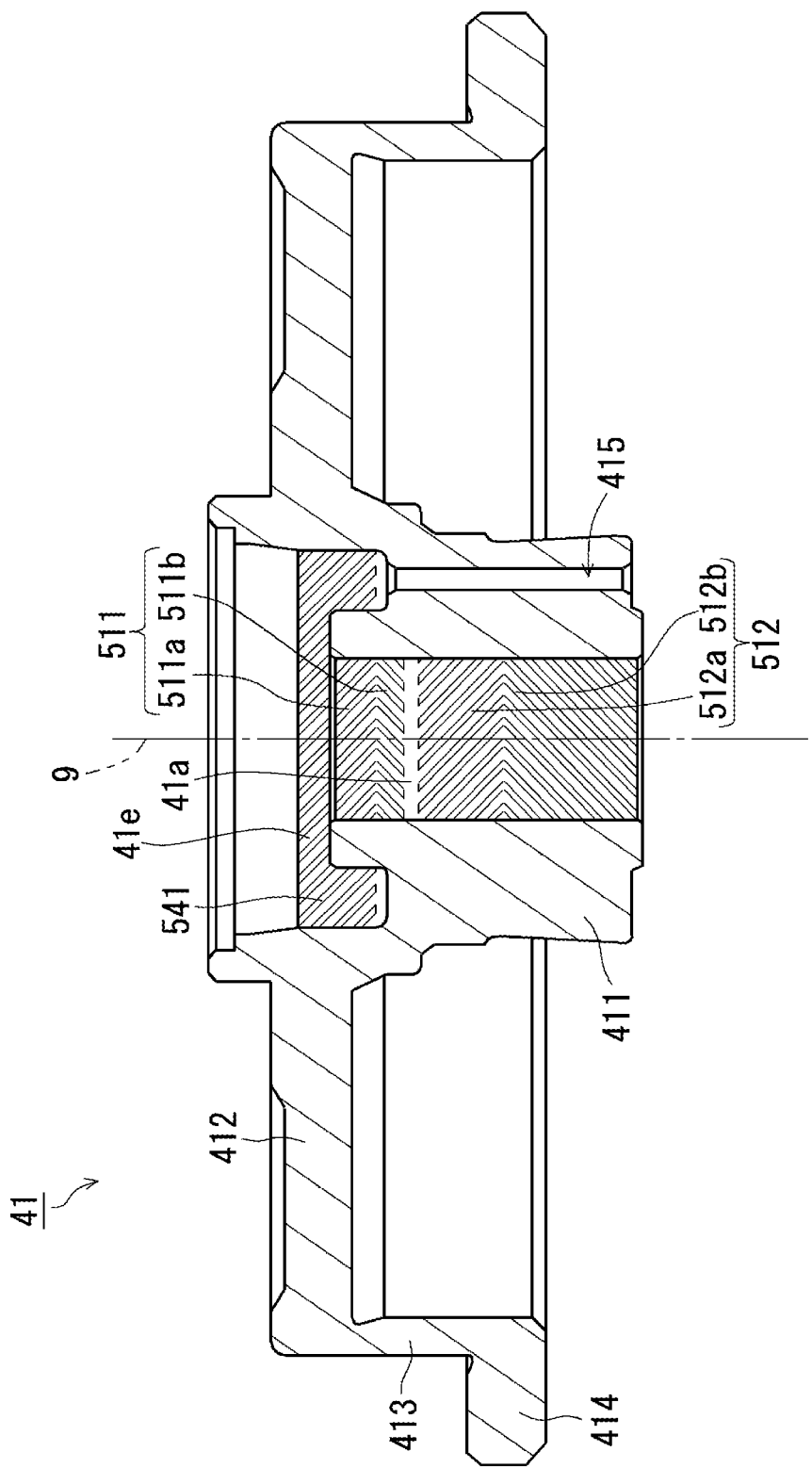
FIG. 5 is a vertical cross-sectional view of the hub.

FIG. 5 is a vertical cross-sectional view of the hub 41. As illustrated in FIG. 5, the inner circumferential surface (hereinafter referred to as a "first inner circumferential surface") 41a of the sleeve portion 411 of the hub 41 has upper and lower radial dynamic pressure groove arrays 511 and 512 arranged thereon to generate a fluid dynamic pressure in the lubricating oil 59 in the gap 51. Each of the upper and lower radial dynamic pressure groove arrays 511 and 512 is an array of a plurality of hook-shaped dynamic pressure generating grooves in a so-called herringbone pattern arranged in a circumferential direction. During the rotation of the hub 41 relative to the stationary shaft 32, a pressure is applied to the lubricating oil 59 in the gap 51 by the upper and lower radial dynamic pressure groove arrays 511 and 512. The hub 41 is arranged to rotate while being radially supported by the fluid dynamic pressure generated in the lubricating oil 59 in the gap 51.

Note that it is enough that the upper and lower radial dynamic pressure groove arrays 511 and 512 are arranged on at least one of the first inner circumferential surface 41a of the hub 41 and the outer circumferential surface of the stationary shaft 32.

As illustrated in FIG. 5, the upper radial dynamic pressure groove array 511 includes a plurality of first parallel grooves 511a arranged to cause a downward flow of the lubricating oil 59, and a plurality of second parallel grooves 511b arranged to cause an upward flow of the lubricating oil 59. Meanwhile, the lower radial dynamic pressure groove array 512 includes a plurality of third parallel grooves 512a arranged to cause a downward flow of the lubricating oil 59, and a plurality of fourth parallel grooves 512b arranged to cause an upward flow of the lubricating oil 59.

In the present preferred embodiment, the sum of the axial dimension of the second parallel grooves 511b and that of the fourth parallel grooves 512b is preferably greater than the sum of the axial dimension of the first parallel grooves 511a and that of the third parallel grooves 512a. Accordingly, an upward flow of the lubricating oil 59 caused by a combination of the second and fourth parallel grooves 511b and 512b is greater than a downward flow of the lubricating oil 59 caused by a combination of the first and third parallel grooves 511a and 512a. Therefore, the upper and lower radial dynamic pressure groove arrays 511 and 512 as a whole serve to cause the lubricating oil 59 to flow upward in the gap 51.

Note that it may be so arranged that the number of second and fourth parallel grooves 511b and 512b is greater than the number of first and third parallel grooves 511a and 512a, and/or that the width and/or depth of the second and fourth parallel grooves 511b and 512b is greater than the width and/or depth of the first and third parallel grooves 511a and 512a, in order to cause the lubricating oil 59 to flow upward in the gap 51.

Figure 6:
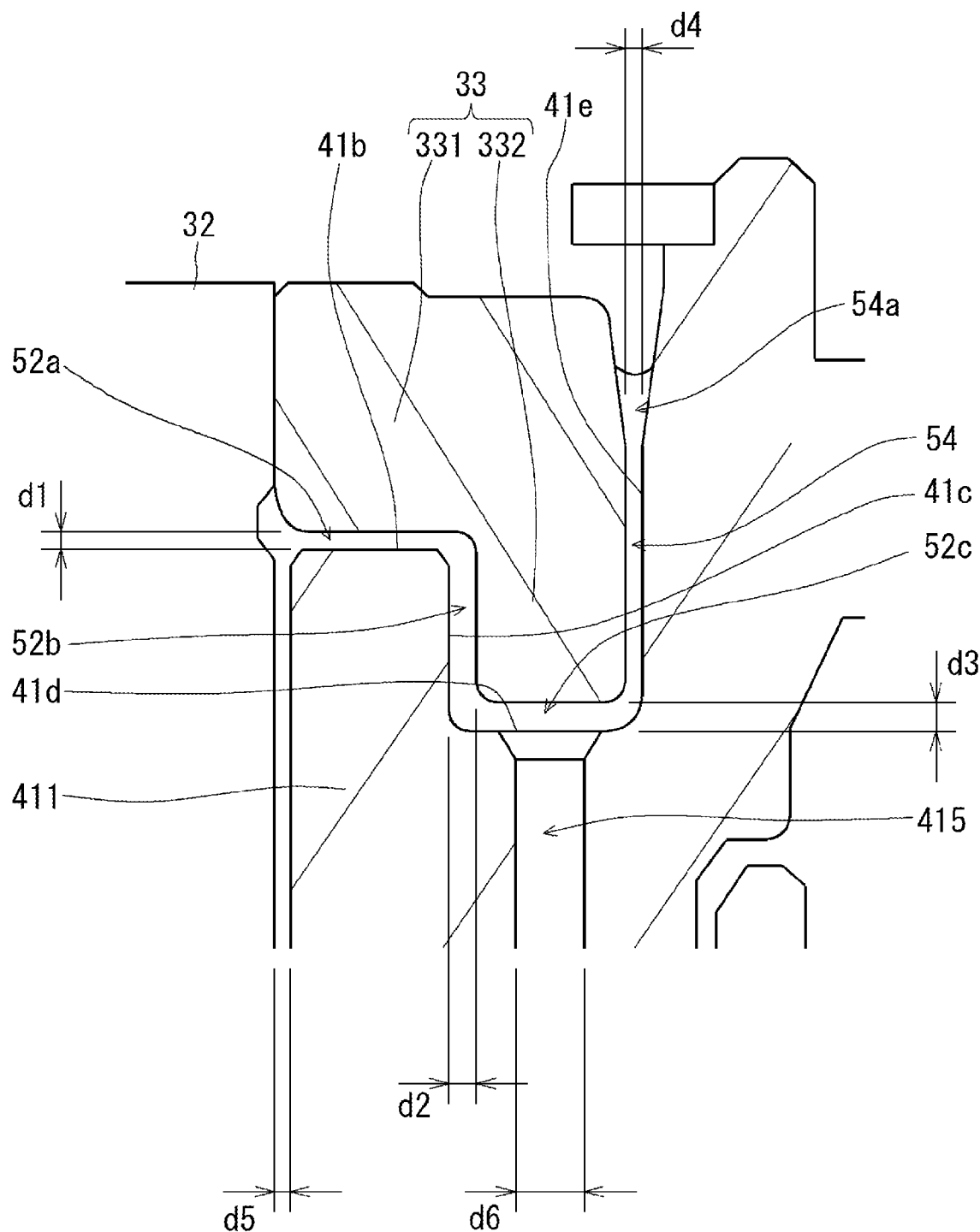
FIG. 6 is an enlarged vertical cross-sectional view of the first cup portion and its vicinity.

FIG. 6 is an enlarged vertical cross-sectional view of the first cup portion 33 and its vicinity. As illustrated in FIG. 6, the upper surface of the sleeve portion 411 of the hub 41 includes a first upper surface 41b, a cylindrical surface 41c, and a second upper surface 41d. The first upper surface 41b spreads radially outward from an upper end portion of the first inner circumferential surface 41a. The cylindrical surface 41c extends downward from an outer edge portion of the first upper surface 41b. The second upper surface 41d spreads radially outward from a lower end portion of the cylindrical surface 41c.

The first upper surface 41b is arranged opposite to a lower surface of the circular plate portion 331 of the first cup portion 33 with a first gap 52a defined therebetween. The cylindrical surface 41c is arranged opposite to an inner circumferential surface of the cylindrical portion 332 of the first cup portion 33 with a second gap 52b defined therebetween. The second upper surface 41d is arranged opposite to a lower surface of the cylindrical portion 332 of the first cup portion with a third gap 52c defined therebetween. The annular recessed portion accommodates a lower end portion of the cylindrical portion 332 of the first cup portion 33.

Figure 7:
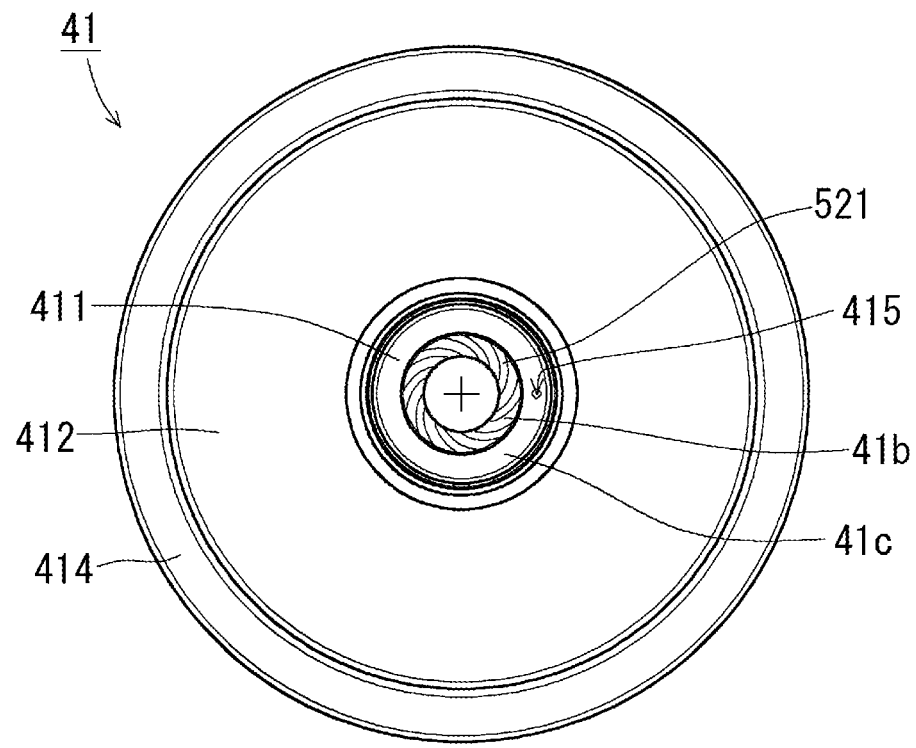
FIG. 7 is a top view of the hub.

FIG. 7 is a top view of the hub 41. As illustrated in FIG. 7, the first upper surface 41b of the hub 41 has an upper thrust dynamic pressure groove array 521 arranged thereon to generate a fluid dynamic pressure in the lubricating oil 59 in the first gap 52a.

The upper thrust dynamic pressure groove array 521 is an array of a plurality of dynamic pressure generating grooves in a spiral pattern centered on the center axis 9 which are arranged in the circumferential direction. During the rotation of the hub 41 relative to the stationary shaft 32, a pressure is applied to the lubricating oil 59 by the upper thrust dynamic pressure groove array 521. The hub 41 is arranged to rotate while being axially supported in relation to the first cup portion 33 by the fluid dynamic pressure generated in the lubricating oil 59.

Note that it is enough that the upper thrust dynamic pressure groove array 521 is arranged on at least one of the first upper surface 41b of the sleeve portion 411 and the lower surface of the circular plate portion 331 of the first cup portion 33.

Returning to FIG. 6, the axial dimension d1 of the first gap 52a is preferably smaller than both the radial dimension d2 of the second gap 52b and the axial dimension d3 of the third gap 52c during the rotation of the hub 41 relative to the stationary shaft 32. For example, the axial dimension d1 of the first gap 52a is preferably about 30 μm or less, and both the radial dimension d2 of the second gap 52b and the axial dimension d3 of the third gap 52c are preferably about 50 μm or greater. This arrangement of the dimensions d1, d2, and d3 enables an excellent generation of the fluid dynamic pressure in the lubricating oil 59 in the first gap 52a while at the same time reducing a loss in torque caused by friction in the second and third gaps 52b and 52c.

An inner circumferential surface (hereinafter referred to as a "second inner circumferential surface") 41e of the plate portion 412 of the hub 41 is arranged opposite to the outer circumferential surface of the first cup portion 33 with a fourth gap 54 defined therebetween. As illustrated in FIG. 5, the second inner circumferential surface 41e of the hub 41 has a pumping groove array 541 arranged thereon to generate a fluid dynamic pressure in the lubricating oil 59 in the fourth gap 54 to cause a downward flow of the lubricating oil 59 therein.

The pumping groove array 541 is preferably an array of a plurality of oblique dynamic pressure generating grooves arranged in the circumferential direction. While the hub 41 rotates with respect to the first cup portion 33, the pumping groove array 541 serves to apply a downward pressure to the lubricating oil 59 in the fourth gap 54, so that the lubricating oil 59 flows toward the lower end portion of the cylindrical portion 332 of the first cup portion 33. Thus, a leakage of the lubricating oil 59 through the fourth gap 54 is prevented.

Note that it is enough that the pumping groove array 541 is arranged on at least one of the second inner circumferential surface 41e of the hub 41 and the outer circumferential surface of the first cup portion 33.

Returning to FIG. 6, the radial dimension d4 of the fourth gap 54 is preferably smaller than both the radial dimension d2 of the second gap 52b and the axial dimension d3 of the third gap 52c during the rotation of the hub 41 relative to the stationary shaft 32. For example, the radial dimension d4 of the fourth gap 54 is preferably in the range of about 10 μm to about 40 μm, and both the radial dimension d2 of the second gap 52b and the axial dimension d3 of the third gap 52c are preferably about 50 μm or greater. This arrangement of the dimensions d2, d3, and d4 makes it possible to cause a downward flow of the lubricating oil 59 in the fourth gap 54 while at the same time reducing the loss in torque caused by friction in the second and third gaps 52b and 52c.

Furthermore, the radial dimension d4 of the fourth gap 54 is preferably greater than the radial dimension d5 of the gap 51 between the outer circumferential surface of the stationary shaft 32 and the first inner circumferential surface 41a of the hub 41.

Furthermore, the radial dimension d2 of the second gap 52b is preferably smaller than the axial dimension d3 of the third gap 52c during the rotation of the hub 41 relative to the stationary shaft 32. A change in conditions such as a temperature during the rotation causes a greater change in the axial dimension d3 of the third gap 52c than in the radial dimension d2 of the second gap 52b. An increase in the axial dimension d3 of the third gap 52c contributes to reducing an influence of the change in the dimension d3 on rotational accuracy or the torque.

A tapered seal portion 54a whose radial dimension gradually increases in an upward direction is arranged in the fourth gap 54 at a level higher than that of the pumping groove array 541. The upper surface of the lubricating oil 59 is located within the tapered seal portion 54a. Accordingly, the upper surface of the lubricating oil 59 is attracted downward by surface tension to provide improved prevention of the leakage of the lubricating oil 59 through the fourth gap 54.

The vertical section of the first cup portion 33 according to the present preferred embodiment substantially assumes the shape of the letter "L" with the circular plate portion 331 and the cylindrical portion 332. Because of the provision of the annular recessed portion above the second upper surface 41d of the hub 41, the first and second inner circumferential surfaces 41a and 41e of the hub 41 partially overlap with each other with respect to the axial direction, so that both the first and second inner circumferential surfaces 41a and 41e of the hub 41 can have a sufficient axial dimension. This makes it possible to limit the axial dimension of the fluid dynamic bearing apparatus 5 as a whole while enabling both the upper and lower radial dynamic pressure groove arrays 511 and 512 and the pumping groove array 541 to be arranged axially in a sufficiently wide range.

Figure 8:
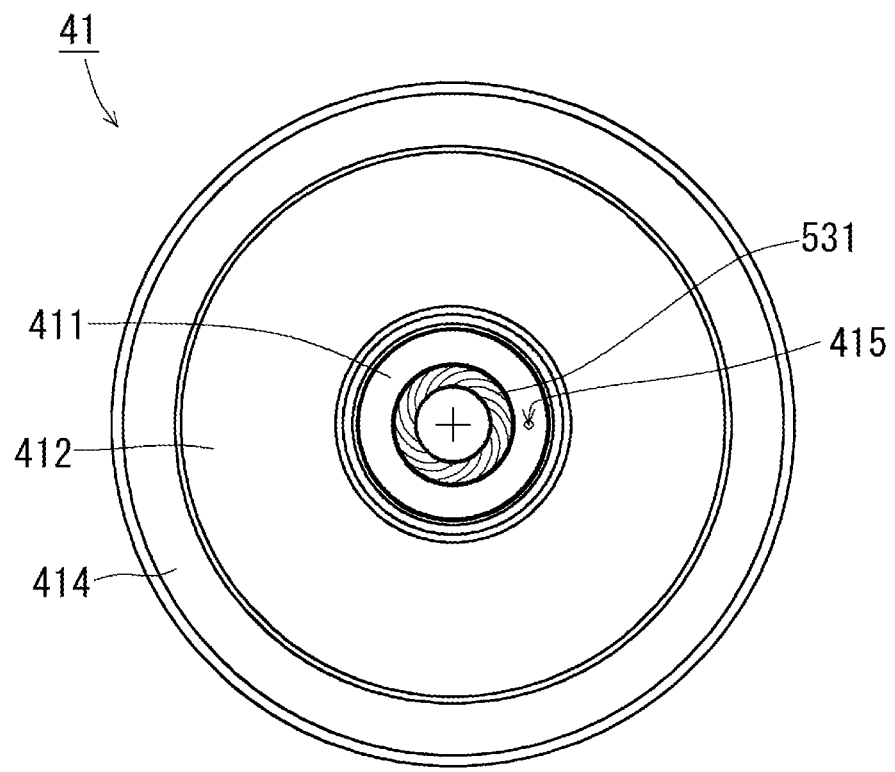
FIG. 8 is a bottom view of the hub.

FIG. 8 is a bottom view of the hub 41. As illustrated in FIG. 8, the lower surface of the sleeve portion 411 of the hub 41 has a lower thrust dynamic pressure groove array 531 arranged thereon to generate a fluid dynamic pressure in the lubricating oil 59 in the gap 53.

The lower thrust dynamic pressure groove array 531 is an array of a plurality of dynamic pressure generating grooves in a spiral pattern centered on the center axis 9 which are arranged in the circumferential direction. During the rotation of the hub 41 relative to the stationary shaft 32, a pressure is applied to the lubricating oil 59 by the lower thrust dynamic pressure groove array 531. The hub 41 is arranged to rotate while being axially supported in relation to the second cup portion 34 by the fluid dynamic pressure generated in the lubricating oil 59.

Note that it is enough that the lower thrust dynamic pressure groove array 531 is arranged on at least one of the lower surface of the sleeve portion 411 and the upper surface of the circular plate portion 341 of the second cup portion 34.

Returning to FIG. 4, the inner circumferential surface of the cylindrical portion 342 of the second cup portion 34 and the outer circumferential surface of the sleeve portion 411 of the hub 41 are arranged opposite to each other with a gap 55 defined therebetween. The lower surface of the lubricating oil 59 is located within the gap 55. The gap 55 defines a tapered seal portion whose radial dimension gradually decreases in a downward direction. Accordingly, the lower surface of the lubricating oil 59 is attracted downward by surface tension, which contributes to preventing a leakage of the lubricating oil 59 through the gap 55.

An upper end opening of the through hole 415 is arranged on the second upper surface 41d of the hub 41. In other words, an upper end of the through hole 415 opens into the third gap 52c defined between the second upper surface 41d of the hub 41 and the lower end portion of the cylindrical portion 332 of the first cup portion 33. The through hole 415 extends downward away from the third gap 52c. On the other hand, a lower end opening of the through hole 415 is arranged on the lower surface of the sleeve portion 411 of the hub 41.

When causing the lubricating oil 59 to produce an axial supporting force, each of the upper and lower thrust dynamic pressure groove arrays 521 and 531 causes the lubricating oil 59 to flow radially inward. Meanwhile, as described above, an upward flow of the lubricating oil 59 is caused in the gap 51. Accordingly, both a radially inward flow of the lubricating oil 59 and a radially outward flow of the lubricating oil 59 are caused in the gap 52. A portion of the lubricating oil 59 flowing radially outward in the gap 52 enters into the through hole 415 to cause a downward flow of the lubricating oil 59 in the through hole 415.

As described above, the lubricating oil 59 is arranged to circulate through the following gaps by flowing therein in the following order: the gap 51, a portion of the gap 52 radially inward of the through hole 415, the through hole 415, a portion of the gap 53 radially inward of the through hole 415, and the gap 51.

The pumping groove array 541 may introduce air bubbles into the lubricating oil 59 in the fourth gap 54 when causing the lubricating oil 59 to flow downward therein. In the present preferred embodiment, the through hole 415 is arranged to enable an excellent discharge of such air bubbles. Specifically, in the present preferred embodiment, the annular recessed portion is arranged above the second upper surface 41d of the hub 41 to accommodate the lower end portion of the cylindrical portion 332 of the first cup portion 33. In addition, the upper end of the through hole 415 is arranged to open into the annular recessed portion, and the lubricating oil 59 is caused to flow downward in the through hole 415. Accordingly, any air bubbles introduced into the lubricating oil 59 are efficiently caused to enter into the through hole 415 through the fourth gap 54 and the third gap 52c. Thereafter, the air bubbles are carried to the gap 55 through the through hole 415 and the gap 53, and discharged out of the fluid dynamic bearing apparatus 5 through the lower surface of the lubricating oil 59.

According to the present preferred embodiment, air bubbles are substantially prevented from intruding into a region facing any of the dynamic pressure groove arrays 511, 512, 521, and 531 where they would cause deterioration of the performance of the dynamic pressure groove array 511, 512, 521, or 531.

Moreover, referring to FIG. 6, the radial dimension d6 of the through hole 415 is preferably greater than both the radial dimension d2 of the second gap 52b and the axial dimension d3 of the third gap 52c during the rotation of the hub 41 relative to the stationary shaft 32, so that any air bubbles introduced into the lubricating oil 59 can be more efficiently caused to enter into the through hole 415.

Hereinafter, additional preferred embodiments of the present invention will be described with reference to the accompanying drawings. It is assumed herein that a direction parallel to a central axis of a spindle motor is referred to by the term "axial direction", "axial", or "axially", that directions perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that the axial direction is a vertical direction, and that a side on which a labyrinth seal is arranged with respect to an upper surface of a lubricating oil is an upper side, and the shape of each member or portion and relative positions of different members or portions will be described based on the above assumptions. Note, however, that the above definitions of the vertical direction and the upper and lower sides are not meant to restrict the orientation of a bearing apparatus, a spindle motor, or a disk drive apparatus according to any preferred embodiment of the present invention when in use.

Figure 9:
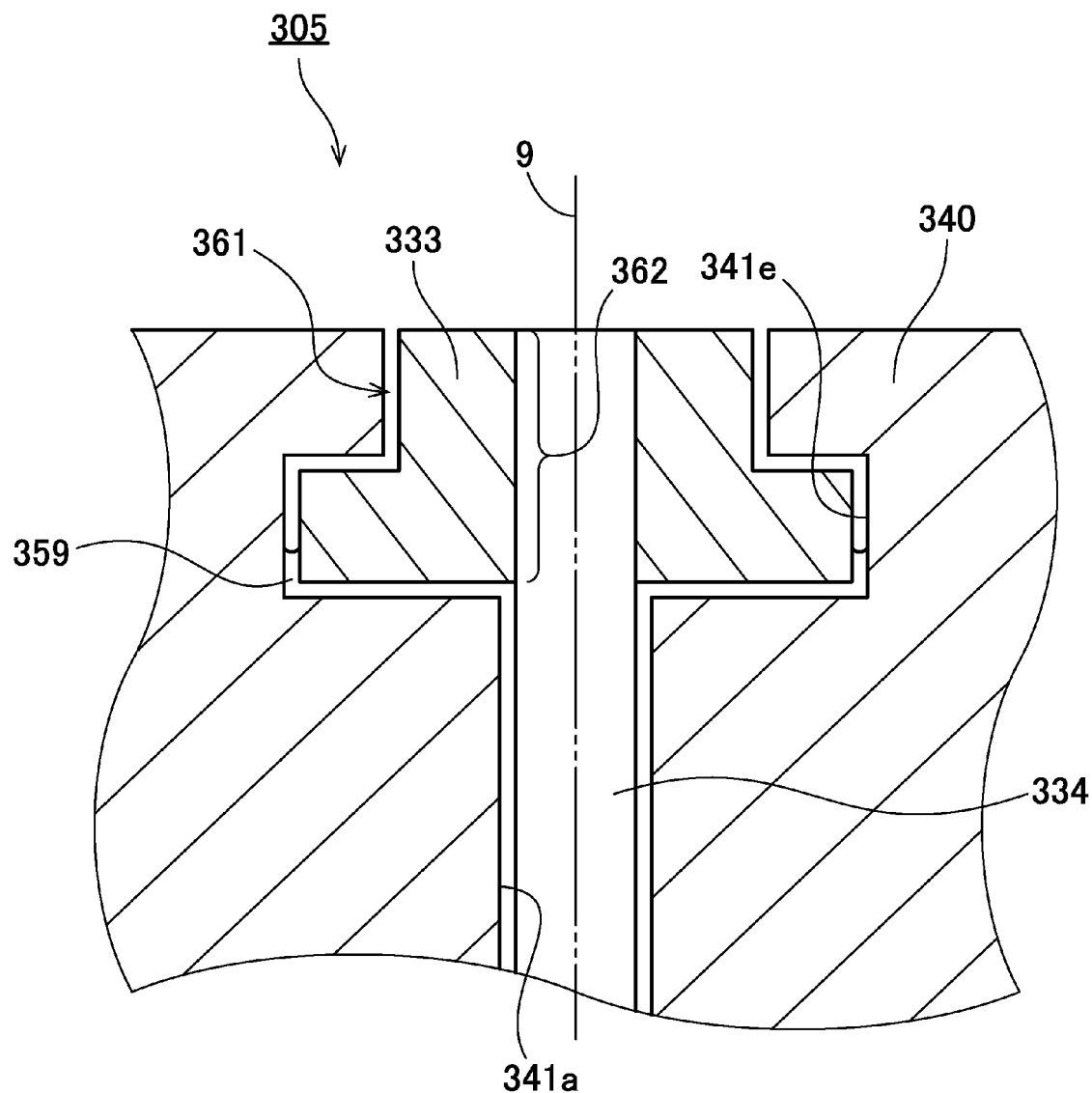
FIG. 9 is a partial vertical cross-sectional view of a bearing apparatus according to a preferred embodiment of the present invention.

FIG. 9 is a partial vertical cross-sectional view of a bearing apparatus 305 according to another preferred embodiment of the present invention. As illustrated in FIG. 9, the bearing apparatus 305 preferably includes a rotating member 340 and a stationary member defined by a stationary shaft 334 and a first annular member 333. The stationary shaft 334 is arranged to extend along a center axis 9 extending in the vertical direction. The first annular member 333 is a substantially annular member fixed to an outer circumferential surface of the stationary shaft 334.

The rotating member 340 is supported to be rotatable about the center axis 9 around the stationary shaft 334. As illustrated in FIG. 9, the rotating member 340 preferably includes a first inner circumferential surface 341a and a second inner circumferential surface 341e. The first inner circumferential surface 341a is arranged opposite to the outer circumferential surface of the stationary shaft 334. The second inner circumferential surface 341e is arranged opposite to an outer circumferential surface of the first annular member 333.

A lubricating oil 359 is arranged in a gap defined between a surface of the stationary member and the rotating member 340. An upper surface of the lubricating oil 359 is located between the first annular member 333 and the second inner circumferential surface 341e of the rotating member 340. In addition, on an upper side of the upper surface of the lubricating oil 359, the first annular member 333 and the rotating member 340 are preferably arranged radially opposite each other with a slight gap defined therebetween, so that a labyrinth seal 361 is defined.

Moreover, in the bearing apparatus 305, a fixing range 362 over which the stationary shaft 334 and the first annular member 333 are fixed to each other is preferably arranged to overlap with the labyrinth seal 361 in a radial direction. This enables each of the labyrinth seal 361 and the fixing range 362 over which the stationary shaft 334 and the first annular member 333 are fixed to each other to have a sufficient axial dimension.

Figure 10:
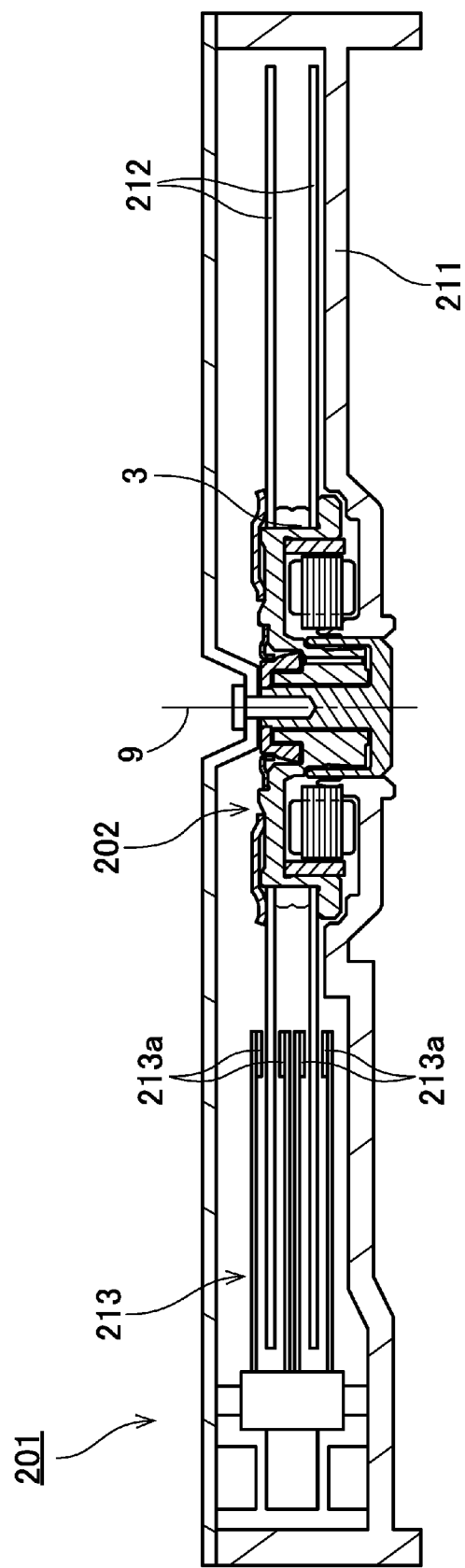
FIG. 10 is a vertical cross-sectional view of a disk drive apparatus according to a preferred embodiment of the present invention.

FIG. 10 is a vertical cross-sectional view of a disk drive apparatus 201 according to another preferred embodiment of the present invention. The disk drive apparatus 201 is preferably an apparatus arranged to rotate magnetic disks 212 (hereinafter referred to simply as "disks 212") and read and write information from or to the disks 212. As illustrated in FIG. 10, the disk drive apparatus 201 preferably includes an apparatus housing 211, the disks 212, which are two in number, an access portion 213, and a spindle motor 202.

The apparatus housing 211 is a case arranged to contain the two disks 212, the access portion 213, and the spindle motor 202. The spindle motor 202 is arranged to rotate the disks 212 about a center axis 9 while supporting the disks 212. The access portion 213 is arranged to move a head 213a along a recording surface of each disk 212 to perform reading and the writing of information from or to the disk 212.

Note that the number of disks 212 included in the disk drive apparatus 201 may be one or more than two. Also note that the access portion 213 may be arranged to perform only one of the reading and the writing of information from or to the disk(s) 212.

Figure 11:
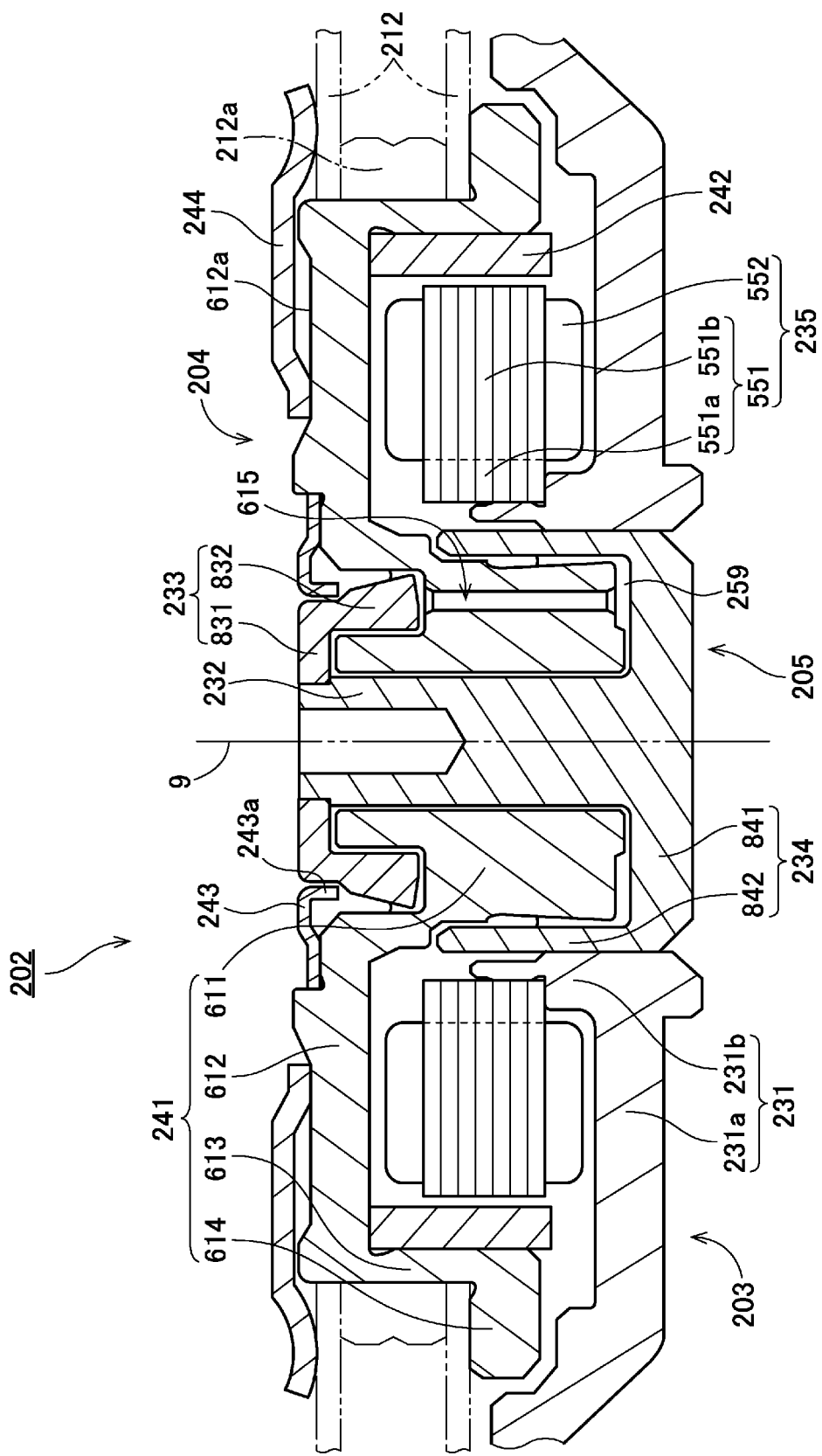
FIG. 11 is a vertical cross-sectional view of a spindle motor according to a preferred embodiment of the present invention.

Next, the structure of the above-described spindle motor 202 will now be described below. FIG. 11 is a vertical cross-sectional view of the spindle motor 202. As illustrated in FIG. 11, the spindle motor 202 preferably includes a stationary portion 203 fixed to the apparatus housing 211 of the disk drive apparatus 201, and a rotating portion 204 arranged to rotate about the center axis 9 while supporting the disks 212.

The stationary portion 203 preferably includes a base member 231, a stationary shaft 232, a first cup portion 233, a second cup portion 234, and a stator unit 235. An upper end portion of the stationary shaft 232 is fixed to a cover member of the apparatus housing 211 (see FIG. 10). Meanwhile, a lower end portion of the stationary shaft 232 is fixed to the base member 231 through the second cup portion 234.

The base member 231 preferably defines a portion of the apparatus housing 211 of the disk drive apparatus 201 (see FIG. 10), and is integrally provided with a remaining portion of the apparatus housing 211 as a single monolithic member. Note, however, that the base member 231 and the apparatus housing 211 may alternatively be defined by separate members if so desired. The base member 231 preferably includes a plate portion 231a arranged to extend radially, and a substantially cylindrical holder portion 231b arranged to project upward from an inner edge portion of the plate portion 231a. The base member 231 is preferably made of a metal such as an aluminum alloy, for example.

The stationary shaft 232 is arranged to extend along the center axis 9. The first cup portion 233 is preferably fixed to the stationary shaft 232 in the vicinity of the upper end portion of the stationary shaft 232. Meanwhile, the second cup portion 234 is arranged in the vicinity of the lower end portion of the stationary shaft 232. The stationary shaft 232 is preferably made of a metal such as stainless steel, for example.

The first cup portion 233 is preferably an annular member fixed to an outer circumferential surface of the stationary shaft 232. In the present preferred embodiment, the first cup portion 233 corresponds to the "first annular member". The first cup portion 233 is preferably, for example, press fitted to the stationary shaft 232 in the vicinity of the upper end portion thereof, and preferably, for example, fixed to the stationary shaft 232 through an adhesive.

The first cup portion 233 according to the present preferred embodiment preferably includes a circular plate portion 831 and a cylindrical portion 832. The circular plate portion 831 is fixed to the outer circumferential surface of the stationary shaft 232, and is arranged to extend radially outward from the stationary shaft 232. The cylindrical portion 832 is a portion in the shape of a cylinder and projecting downward from a lower surface of an outer edge portion of the circular plate portion 831. A vertical section of the first cup portion 233 preferably substantially assumes the shape of the letter "L" with the circular plate portion 831 and the cylindrical portion 832. The first cup portion 233 is preferably made of a resin or a metal containing copper as a main component, for example.

The second cup portion 234 is an annular portion arranged at a level lower than that of the first cup portion 233. In the present preferred embodiment, the second cup portion 234 corresponds to a "second annular member". In the present preferred embodiment, the stationary shaft 232 and the second cup portion 234 are preferably defined by a single continuous monolithic member. Therefore, a large axial dimension is not needed to ensure a sufficient strength with which the stationary shaft 232 and the second cup portion 234 are fixed to each other. Thus, the stationary shaft 232 and the second cup portion 234 as a whole can be shortened in the axial direction. Note, however, that the stationary shaft 232 and the second cup portion 234 may alternatively be defined by separate members, if so desired.

The second cup portion 234 according to the present preferred embodiment preferably includes a circular plate portion 841 and a cylindrical portion 842. The circular plate portion 841 is a substantially disk-shaped portion extending radially outward from the stationary shaft 232. The cylindrical portion 842 is a portion in the shape of a cylinder and projecting upward from an outer edge portion of the circular plate portion 841. The cylindrical portion 842 is fixed to an inner circumferential surface of the holder portion 231b of the base member 231. A vertical section of the second cup portion 234 preferably substantially assumes the shape of the letter "L" with the circular plate portion 841 and the cylindrical portion 842.

The stator unit 235 preferably includes a stator core 551 and a plurality of coils 552. The stator core 551 includes an annular core back 551a and a plurality of tooth portions 551b. The core back 551a is fixed to an outer circumferential surface of the holder portion 231b of the base member 231. The tooth portions 551b are arranged to project radially outward from the core back 551a. The stator core 551 is preferably defined by laminated steel sheets, e.g., electromagnetic steel sheets placed one upon another in the axial direction, however, any other desirable type of stator core could be used. Each of the coils 552 is defined by a conducting wire wound around a separate one of the tooth portions 551b.

The rotating portion 204 preferably includes a hub 241, a rotor magnet 242, a cap 243, and a clamper 244. The hub 241 is arranged to rotate about the center axis 9 around the stationary shaft 232. A metal such as ferromagnetic stainless steel, for example, is preferably used as a material of the hub 241. The hub 241 preferably includes a sleeve portion 611, a plate portion 612, an outer cylindrical portion 613, and a flange portion 614. The sleeve portion 611 is preferably a substantially cylindrical portion including an inner circumferential surface arranged opposite to the outer circumferential surface of the stationary shaft 232. The sleeve portion 611 is arranged axially between the circular plate portion 831 of the first cup portion 233 and the circular plate portion 841 of the second cup portion 234. The plate portion 612 is a portion extending radially outward from an upper end portion of the sleeve portion 611. The outer cylindrical portion 613 is a portion extending downward from an outer edge portion of the plate portion 612. The flange portion 614 is a portion projecting radially outward from a lower end portion of the outer cylindrical portion 613.

At least a portion of an outer circumferential surface of the outer cylindrical portion 613 is used as a contact surface with which an inner circumferential portion of each of the two disks 212 is arranged to be in contact. In addition, an upper surface of the flange portion 614 is used as a mounting surface on which a lower one of the disks 212 is mounted. The lower disk 212 is mounted on the upper surface of the flange portion 614, and an upper one of the disks 212 is mounted on a spacer 212a arranged on the lower disk 212. The inner circumferential portion of each disk 212 is arranged to be in contact with the outer circumferential surface of the outer cylindrical portion 613, so that the radial position of each disk 212 is determined. Thus, the outer cylindrical portion 613 and the flange portion 614 together define a support portion arranged to support the two disks 212.

The rotor magnet 242 is preferably fixed to an inner circumferential surface of the outer cylindrical portion 613 of the hub 241. The rotor magnet 242 preferably has an annular shape centered on the center axis 9. An inner circumferential surface of the rotor magnet 242 is arranged radially opposite to an outer circumferential surface of each of the tooth portions 551b of the stator core 551. In addition, the inner circumferential surface of the rotor magnet 242 preferably defines a pole surface where the north and south poles alternate with each other.

The cap 243 is preferably an annular member fixed to an upper surface of the plate portion 612 of the hub 241. The cap 243 is arranged above an upper surface of a lubricating oil 259, which will be described below. The cap 243 is preferably produced, for example, by subjecting a metal to press working. Note, however, that the cap 243 may be produced by another method, and may be a resin molded article. The cap 243 according to the present preferred embodiment preferably includes, in an inner end portion thereof, a bend portion 243a arranged to extend downward to substantially assume the shape of a cylinder. An inner circumferential surface of the bend portion 243a is arranged radially opposite an outer circumferential surface of the circular plate portion 831 of the first cup portion 233 with a slight gap defined therebetween.

The clamper 244 is a member arranged to press the two disks 212 downward. A radially inner end portion of the clamper 244 is fixed to the upper surface of the plate portion 612 of the hub 241. Meanwhile, a lower surface of a radially outer end portion of the clamper 244 is arranged to be in contact with an upper surface of the upper disk 212. The two disks 212 are held between the clamper 244 and the flange portion 614 of the hub 241 and thereby positioned in the axial direction.

The lubricating oil 259 is arranged in a minute gap defined between the hub 241 and a combination of the stationary shaft 232, the first cup portion 233, and the second cup portion 234. The upper surface of the lubricating oil 259 is located between an outer circumferential surface of the cylindrical portion 832 of the first cup portion 233 and an inner circumferential surface of the plate portion 612 of the hub 241. Meanwhile, a lower surface of the lubricating oil 259 is located between an inner circumferential surface of the cylindrical portion 842 of the second cup portion 234 and an outer circumferential surface of the sleeve portion 611 of the hub 241.

The sleeve portion 611 of the hub 241 preferably includes a through hole 615 arranged to extend in the axial direction from an upper surface to a lower surface of the sleeve portion 611. The through hole 615 is also filled with the lubricating oil 259. An oil containing an ester as a main component, such as a polyolester oil or a diester oil, for example, is preferably used as the lubricating oil 259.

The hub 241 and the cap 243 are supported to be rotatable with respect to the stationary shaft 232, the first cup portion 233, and the second cup portion 234 through the lubricating oil 259. That is, in the present preferred embodiment, the stationary shaft 232, the first cup portion 233, the second cup portion 234, the hub 241, and the cap 243 together define a fluid dynamic bearing apparatus 205 arranged to join the stationary and rotating portions 203 and 204 to each other such that the stationary and rotating portions 203 and 204 are rotatable relative to each other. The stationary shaft 232, the first cup portion 233, and the second cup portion 234 together define a stationary member of the fluid dynamic bearing apparatus 205. Meanwhile, the hub 241 and the cap 243 together define a rotating member of the fluid dynamic bearing apparatus 205.

Regarding the spindle motor 202 described above, once drive currents are supplied to the coils 552 of the stationary portion 203, radial magnetic flux is generated around each of the tooth portions 551b of the stator core 551. Then, the magnetic flux of the tooth portions 551b and that of the rotor magnet 242 interact with each other to produce a circumferential torque, so that the rotating portion 204 is caused to rotate about the center axis 9 with respect to the stationary portion 203. The disks 212 supported by the hub 241 and the clamper 244 are caused to rotate about the center axis 9 together with the rotating portion 204.

Figure 12:
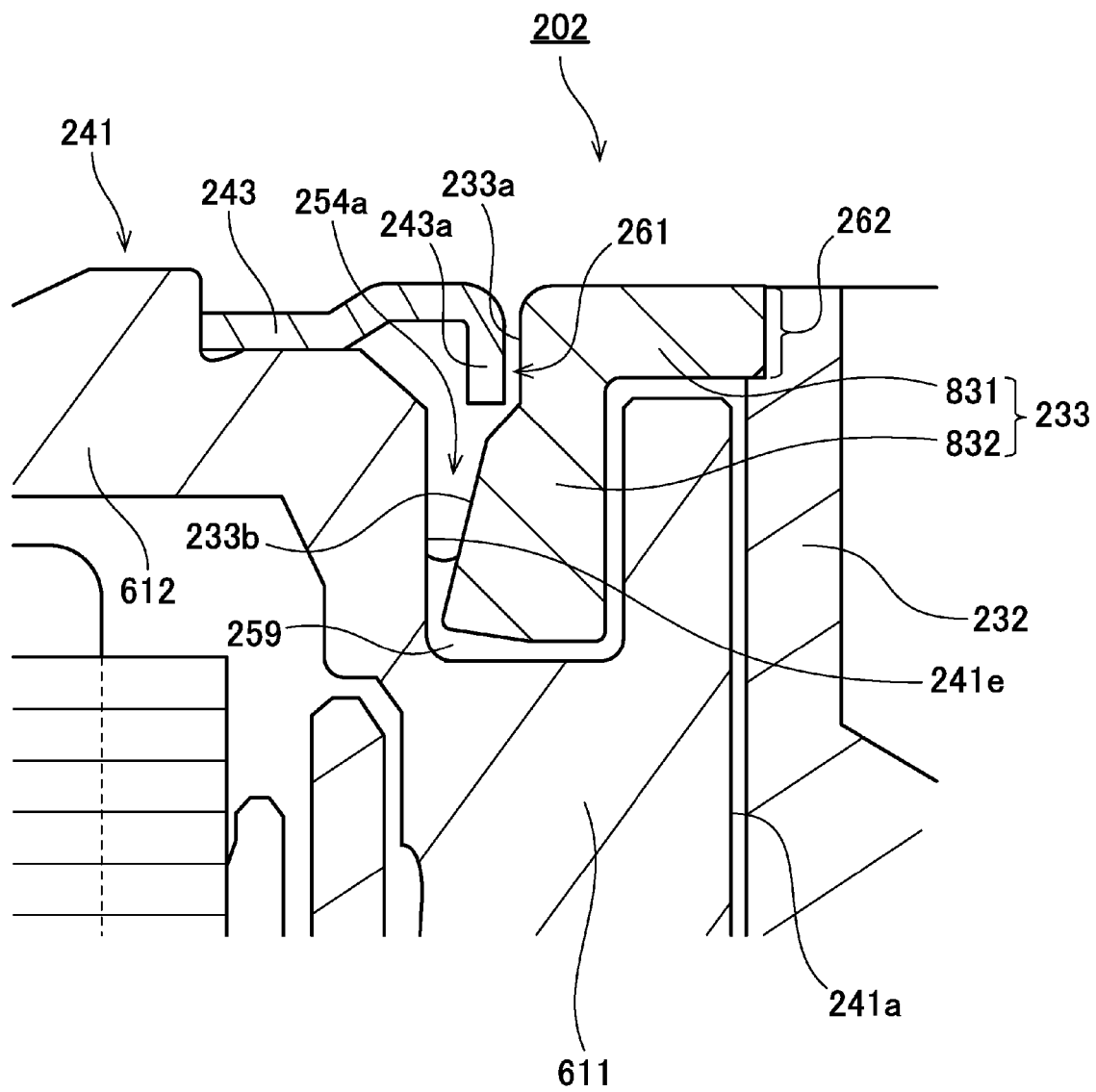
FIG. 12 is a partial vertical cross-sectional view of the spindle motor according to a preferred embodiment of the present invention.

FIG. 12 is a partial vertical cross-sectional view of the spindle motor 202. Hereinafter, with reference to FIGS. 11 and 12, the structure of the fluid dynamic bearing apparatus 205 will now be further described below.

An inner circumferential surface (hereinafter referred to as a "first inner circumferential surface") 241a of the sleeve portion 611 and the outer circumferential surface of the stationary shaft 232 are arranged radially opposite each other. The first inner circumferential surface 241a or the outer circumferential surface of the stationary shaft 232 preferably includes a radial dynamic pressure groove array (not shown) defined therein. The radial dynamic pressure groove array is preferably, for example, an array of grooves arranged in a herringbone pattern. The radial dynamic pressure groove array is arranged to generate a dynamic pressure in the lubricating oil 259 during driving of the spindle motor 202 so that the hub 241 may rotate while being supported in the radial direction by this dynamic pressure.

The upper surface of the sleeve portion 611 or a lower surface of the first cup portion 233 preferably includes a thrust dynamic pressure groove array (not shown) defined therein. In addition, the lower surface of the sleeve portion 611 or an upper surface of the circular plate portion 841 of the second cup portion 234 preferably includes a thrust dynamic pressure groove array (not shown) defined therein. Each of the thrust dynamic pressure groove arrays is, for example, an array of grooves arranged in a spiral pattern. Each thrust dynamic pressure groove array is arranged to generate a dynamic pressure in the lubricating oil 259 during the drive of the spindle motor 202 so that the hub 241 may rotate while being supported in the axial direction by this dynamic pressure.

As illustrated in FIG. 12, the radial distance between a second inner circumferential surface 241e of the hub 241 and the outer circumferential surface of the cylindrical portion 832 of the first cup portion 233 is preferably arranged to gradually increase in an upward direction. That is, the second inner circumferential surface 241e of the hub 241 and the outer circumferential surface of the cylindrical portion 832 of the first cup portion 233 are preferably arranged to together define a tapered seal portion 254a therebetween. The upper surface of the lubricating oil 259 is located in the tapered seal portion 254a. The upper surface of the lubricating oil 259 is accordingly attracted downward by surface tension, which contributes to preventing a leakage of the lubricating oil 259.

Moreover, in the present preferred embodiment, an upper end portion of the first inner circumferential surface 241a of the hub 241 is arranged at a level higher than that of a lower end portion of the cylindrical portion 832 of the first cup portion 233. Accordingly, the first inner circumferential surface 241a of the hub 241, the second inner circumferential surface 241e, and the cylindrical portion 832 of the first cup portion 233 partially overlap with one another with respect to the axial direction, so that each of the first inner circumferential surface 241a, the second inner circumferential surface 241e, and the cylindrical portion 832 is allowed to have a sufficient axial dimension. This makes it possible to reduce the axial dimension of the fluid dynamic bearing apparatus 205 while enabling each of the radial dynamic pressure groove array and the tapered seal portion 254a to be arranged axially over a sufficiently wide range.

Furthermore, as illustrated in FIG. 11, on an upper side of the upper surface of the lubricating oil 259, the inner circumferential surface of the bend portion 243a of the cap 243 and an outer circumferential surface (hereinafter referred to as a "first outer circumferential surface") 233a of the circular plate portion 831 of the first cup portion 233 are preferably arranged radially opposite each other with a slight gap defined therebetween. Thus, entry and exit of a gas through this gap are limited. This preferably contributes to reducing evaporation of the lubricating oil 259 through the upper surface of the lubricating oil 259. That is, in the present preferred embodiment, the cap 243 and the first cup portion 233 together define a labyrinth seal 261. The labyrinth seal 261 is preferably arranged to have a radial dimension of about 0.2 mm or less, for example.

In the fluid dynamic bearing apparatus 205, the labyrinth seal 261 preferably is not arranged between the cap 243 and the stationary shaft 232 but is instead arranged between the cap 243 and the first cup portion 233 fixed to the stationary shaft 232. In addition, the labyrinth seal 261 and a fixing range 262 over which the stationary shaft 232 and the first cup portion 233 are fixed to each other are arranged to overlap with each other in the radial direction. Each of the fixing range 262 and the labyrinth seal 261 is thus allowed to have a sufficient axial dimension. The fixing range 262 and the labyrinth seal 261 as a whole can be shortened in the axial direction.

Furthermore, in the present preferred embodiment, the labyrinth seal 261 preferably is not arranged between the first cup portion 233 and the hub 241 but is instead arranged between the first cup portion 233 and the cap 243 fixed to the hub 241. This eliminates a need to complicate the shape of the first cup portion 233 or the hub 241 in order to define the labyrinth seal 261, thereby making it easier to manufacture the first cup portion 233 and the hub 241. Furthermore, when the fluid dynamic bearing apparatus 205 is manufactured, it is possible to easily inject the lubricating oil 259 into a gap between the first cup portion 233 and the hub 241 before attachment of the cap 243.

Furthermore, in the present preferred embodiment, the labyrinth seal 261 is preferably defined by the inner circumferential surface of the substantially cylindrical bend portion 243a provided in the cap 243 and the first outer circumferential surface 233a of the first cup portion 233. The labyrinth seal 261 is thus preferably allowed to have a greater axial dimension than in the case where the bend portion 243a is not provided in the cap 243. Entry and exit of the gas through the labyrinth seal 261 are thereby further limited. This preferably leads to a further reduction in the evaporation of the lubricating oil 259.

Furthermore, the first cup portion 233 according to the present preferred embodiment preferably includes a second outer circumferential surface 233b arranged radially opposite the second inner circumferential surface 241e on a lower side of the first outer circumferential surface 233a which contributes to defining the labyrinth seal 261. That is, the first cup portion 233 according to the present preferred embodiment is preferably a single continuous monolithic member including the first and second outer circumferential surfaces 233a and 233b. The first cup portion 233 is thus able to achieve reduced axial dimension compared to the case where the first cup portion 233 is defined by two members. Moreover, relative displacement of the first and second outer circumferential surfaces 233a and 233b can thus be prevented. This makes it easier to accurately define each of the labyrinth seal 261 and the tapered seal portion 254a.

Furthermore, in the present preferred embodiment, the labyrinth seal 261 is arranged radially inward of the upper surface of the lubricating oil 259. This arrangement enables the labyrinth seal 261 to have a relatively small diameter, and this leads to a reduction in the area of an opening of the labyrinth seal 261. The entry and exit of the gas through the labyrinth seal 261 are thereby further limited. This leads to a further reduction in the evaporation of the lubricating oil 259.

Furthermore, in the present preferred embodiment, the labyrinth seal 261 is preferably arranged to have an axial dimension equal to or greater than that of the fixing range 262. A greater axial dimension of the labyrinth seal 261 contributes to further limiting the entry and exit of the gas through the labyrinth seal 261. This leads to a further reduction in the evaporation of the lubricating oil 259.

Furthermore, as illustrated in FIG. 11, in the present preferred embodiment, the plate portion 612 of the hub 241 preferably includes an annular upper surface 612a. The annular upper surface 612a is arranged radially outward of the upper surface of the lubricating oil 259 and at a level lower than a level of an upper end surface of the first cup portion 233. In addition, the clamper 244 is preferably arranged radially outward of the first cup portion 233 and on the annular upper surface 612a. A portion of the first cup portion 233 and a portion of the clamper 244 are thus arranged to overlap with each other in the radial direction. The first cup portion 233 and the clamper 244 as a whole can thus be shortened in the axial direction. Moreover, this preferably makes it possible to increase the axial dimension of each of the labyrinth seal 261 and the fixing range 262 while disposing the clamper 244.

Figure 13:
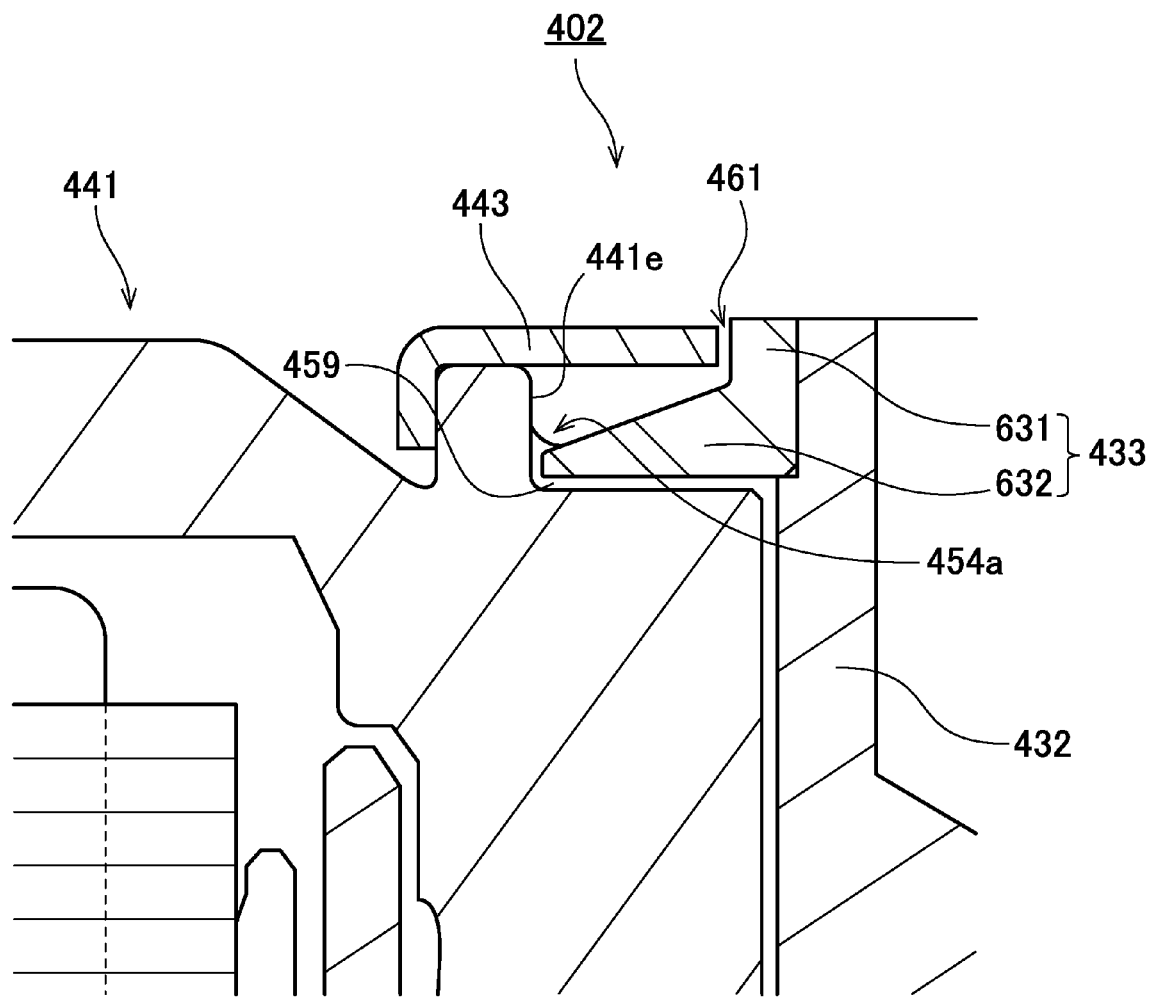
FIG. 13 is a partial vertical cross-sectional view of a spindle motor according to a modification of the above preferred embodiment of the present invention.

FIG. 13 is a partial vertical cross-sectional view of a spindle motor 402 according to a modification of the above-described preferred embodiment. In the modification illustrated in FIG. 13, instead of the first cup portion, a first annular member 433 preferably including a cylindrical portion 631 and a cone portion 632 is fixed to an upper end portion of a stationary shaft 432. The cylindrical portion 631 is arranged to extend in the axial direction to substantially assume the shape of a cylinder on a radially inner side of a cap 443. The cone portion 632 is preferably arranged below the cap 443, and includes an outer circumferential surface substantially in the shape of a cone. The cone portion 632 is arranged to extend radially outward from the cylindrical portion 631.

In the modification illustrated in FIG. 13, the radial distance between the outer circumferential surface of the cone portion 632 and a second inner circumferential surface 441e of a hub 441, which is opposed to the outer circumferential surface of the cone portion 632, is preferably arranged to gradually increase in an upward direction, so that a tapered seal portion 454a is defined. An upper surface of a lubricating oil 459 is located in the tapered seal portion 454a. Accordingly, the upper surface of the lubricating oil 459 is attracted downward by surface tension, which contributes to preventing a leakage of the lubricating oil 459.

Moreover, in the modification illustrated in FIG. 13, an outer circumferential surface of the cylindrical portion 631 and an inner circumferential portion of the cap 443 are arranged radially opposite each other with a slight gap defined therebetween. Thus, entry and exit of a gas through this gap are limited. This contributes to reducing evaporation of the lubricating oil 459 through the upper surface of the lubricating oil 459. That is, in the modification illustrated in FIG. 13, the outer circumferential surface of the cylindrical portion 631 and the inner circumferential portion of the cap 443 together define a labyrinth seal 461. This arrangement preferably enables the labyrinth seal 461 to have a decreased diameter compared to the diameter of the labyrinth seal 261 according to the above-described preferred embodiment such that entry and exit of the gas through the labyrinth seal 461 are thereby further limited.

Figure 14:
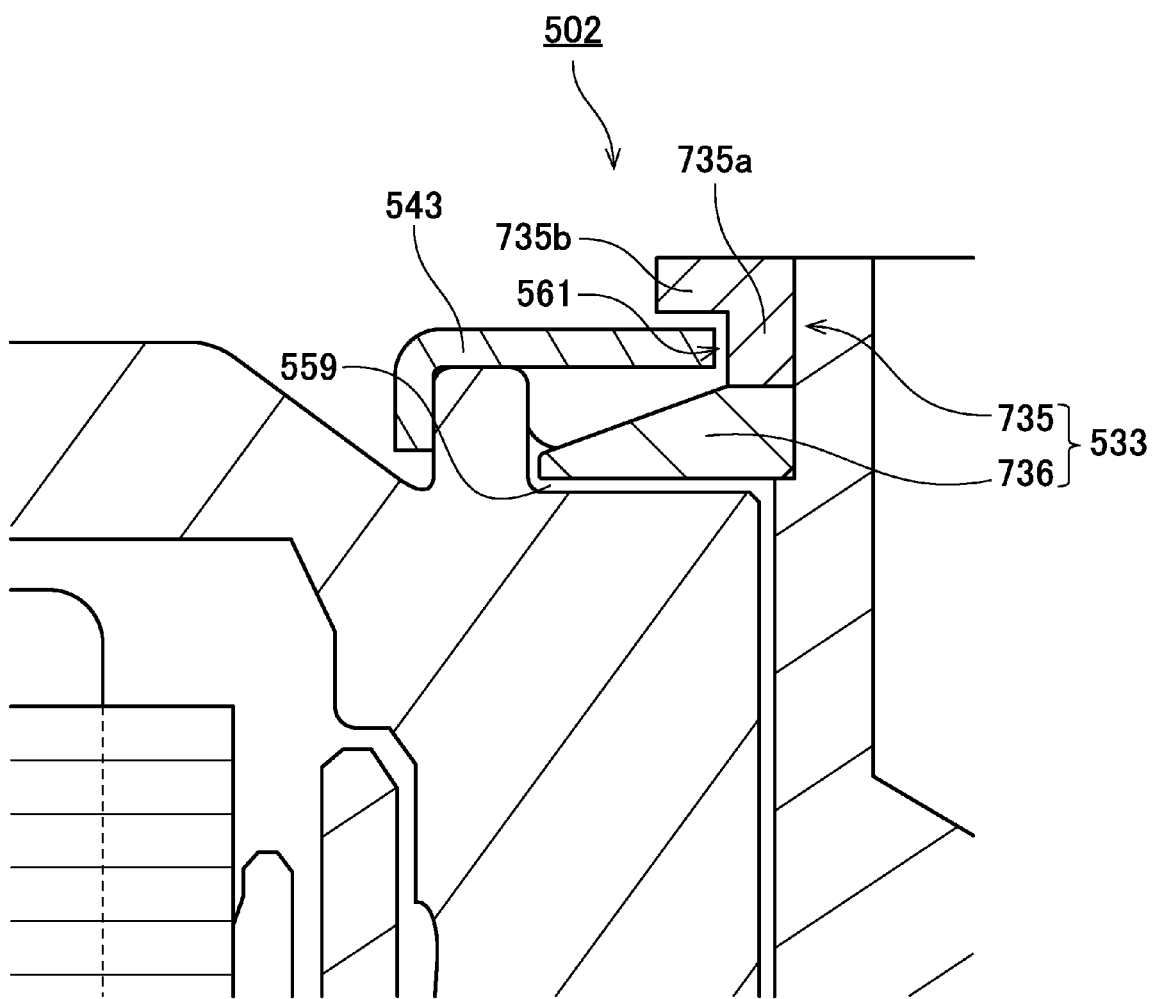
FIG. 14 is a partial vertical cross-sectional view of a spindle motor according to a modification of the above preferred embodiment of the present invention.

FIG. 14 is a partial vertical cross-sectional view of a spindle motor 502 according to another modification of the above-described preferred embodiment. In the modification illustrated in FIG. 14, a first annular member 533 is preferably defined by two members, an upper annular member 735 and a lower annular member 736. The upper annular member 735 preferably includes a cylindrical portion 735a and an annular projecting portion 735b. The cylindrical portion 735a is arranged to extend in the axial direction to substantially assume the shape of a cylinder on a radially inner side of a cap 543. The annular projecting portion 735b is preferably arranged to project radially outward from an upper end portion of the cylindrical portion 735a. Meanwhile, the lower annular member 736 includes an outer circumferential surface substantially in the shape of a cone.

In the modification illustrated in FIG. 14, an outer circumferential surface of the cylindrical portion 735a and an inner circumferential portion of the cap 543 are preferably arranged radially opposite each other with a slight gap defined therebetween. In addition, a lower surface of the annular projecting portion 735b and an upper surface of the cap 543 are preferably arranged axially opposite each other with a slight gap defined therebetween. Thus, entry and exit of a gas through these continuous gaps are limited. This preferably contributes to reducing evaporation of a lubricating oil 559 through an upper surface of the lubricating oil 559. That is, in the modification illustrated in FIG. 14, the cap 543 and a combination of the cylindrical portion 735a and the annular projecting portion 735b together preferably define a labyrinth seal 561. Thus, not only the radial gap but also the axial gap is used to define the labyrinth seal 561. Entry and exit of the gas through the labyrinth seal 561 are thus further limited.

Figure 15:
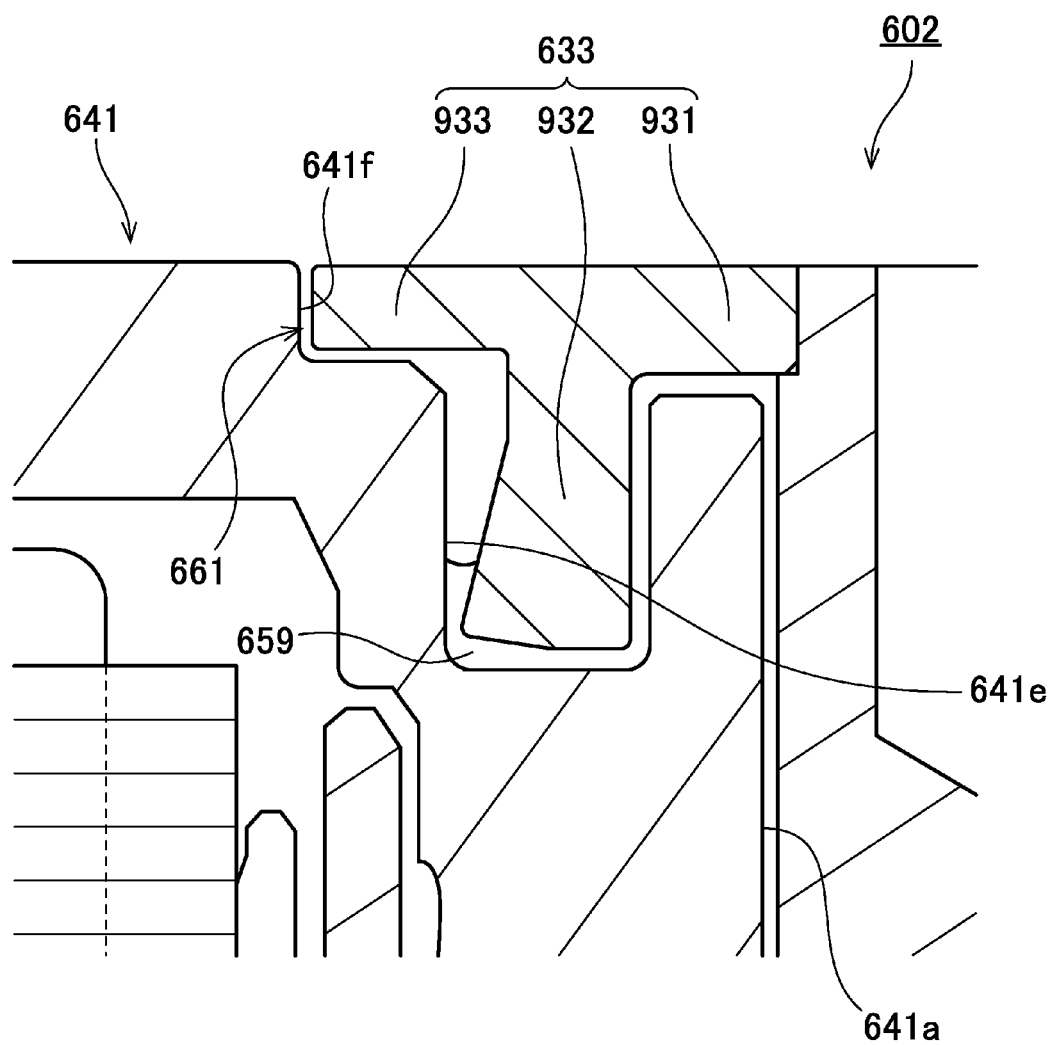
FIG. 15 is a partial vertical cross-sectional view of a spindle motor according to a modification of the above preferred embodiment of the present invention.

FIG. 15 is a partial vertical cross-sectional view of a spindle motor 602 according to yet another modification of the above-described preferred embodiment. In the modification illustrated in FIG. 15, a first annular member 633 preferably includes a circular plate portion 931 and a cylindrical portion 932, and additionally includes an annular projecting portion 933 arranged to project radially outward from an outer circumferential portion of the circular plate portion 931. Meanwhile, a hub 641 preferably includes a first inner circumferential surface 641a and a second inner circumferential surface 641e, and additionally includes a third inner circumferential surface 641f arranged radially outward of the annular projecting portion 933.

In the modification illustrated in FIG. 15, an outer circumferential surface of the annular projecting portion 933 and the third inner circumferential surface 641f of the hub 641 are preferably arranged radially opposite each other with a slight gap defined therebetween. Thus, entry and exit of a gas through this gap are limited. This preferably contributes to reducing evaporation of a lubricating oil 659 through an upper surface of the lubricating oil 659. That is, in the modification illustrated in FIG. 15, the outer circumferential surface of the annular projecting portion 933 and the third inner circumferential surface 641f of the hub 641 preferably together define a labyrinth seal 661. The above arrangement eliminates a need to provide a cap. A reduction in the number of components of the bearing apparatus is thereby achieved.

Figure 16:
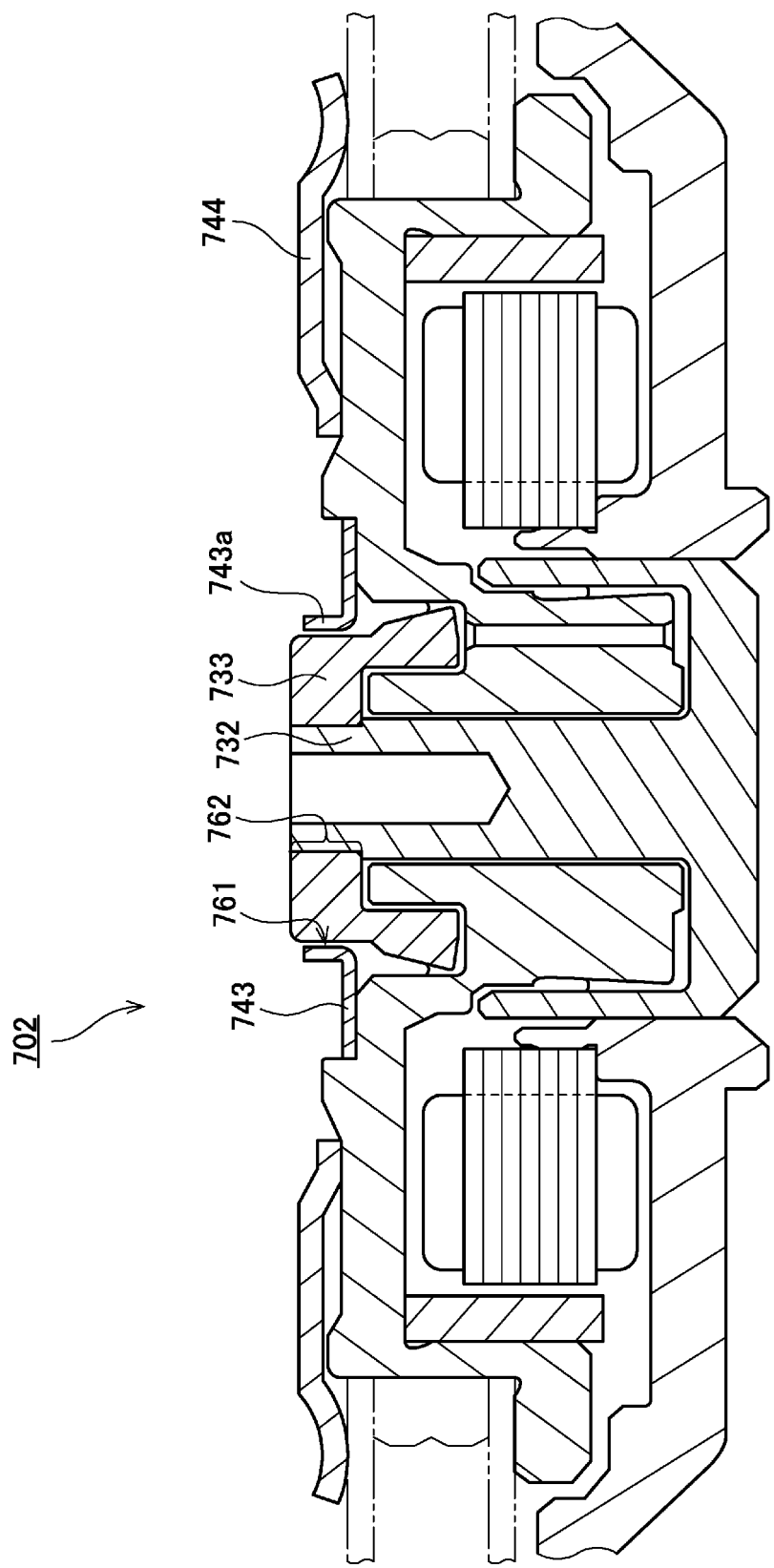
FIG. 16 is a vertical cross-sectional view of a spindle motor according to a modification of the above preferred embodiment of the present invention.

FIG. 16 is a vertical cross-sectional view of a spindle motor 702 according to yet another modification of the above-described preferred embodiment. In the modification illustrated in FIG. 16, an inner circumferential portion of a cap 743 is arranged to bend upward. In other words, the cap 743 preferably includes a bend portion 743a arranged to extend upward to substantially assume the shape of a cylinder in an inner end portion thereof. An inner circumferential surface of the bend portion 743a and an outer circumferential surface of a first cup portion 733 preferably together define a labyrinth seal 761. The bend portion 743a of the cap 743 is thus arranged to overlap with a clamper 744 in the radial direction. Thus, the axial dimension of the cap 743 and the clamper 744 as a whole can be shortened.

Moreover, in the modification illustrated in FIG. 16, the labyrinth seal 761, the clamper 744, and a fixing range 762 over which a stationary shaft 732 and the first cup portion 733 are fixed to each other are preferably arranged to overlap with one another in the radial direction. Thus, the labyrinth seal 761, the clamper 744, and the fixing range 762 as a whole can be shortened in the axial direction.

Furthermore, in the modification illustrated in FIG. 16, the fixing range 762 is preferably arranged to have an axial dimension equal to or greater than that of the labyrinth seal 761. This leads to improved accuracy with which the first cup portion 733 is fixed to the stationary shaft 732. This makes it possible to define the labyrinth seal 761 with improved accuracy.

Note that the present invention is also applicable to spindle motors arranged to rotate other types of disks than magnetic disks, such as an optical disk or the like. Note, however, that an application of the present invention to a spindle motor designed for a magnetic disk(s) has great technological significance, because the spindle motor designed for the magnetic disk(s) requires a particularly excellent rotation performance of a fluid dynamic bearing apparatus. In addition, the present invention achieves a reduction in, in particular, the axial dimension of a disk drive apparatus. Therefore, the present invention is particularly usable for spindle motors used in disk drive apparatuses designed for slim notebook PCs and tablet PCs.

Note that the detailed shape of any member may be different from the shape thereof as illustrated in the accompanying drawings of the present application. Also note that features of the above-described preferred embodiments and the modifications thereof may be combined appropriately as long as no conflict arises.

For example, the lower end portion of the cylindrical portion of the first cup portion is preferably flat in the above-described preferred embodiment, but may be curved in other preferred embodiments. Also, the annular recessed portion of the rotating portion includes a flat surface, i.e., the second upper surface 41d, in the above-described preferred embodiment. Note, however, that the annular recessed portion may be defined by only sloping or curved surfaces in other preferred embodiments. Various modifications may be made to the annular recessed portion insofar as the annular recessed portion is arranged to accommodate at least the lower end portion of the cylindrical portion of the first cup portion, while at the same time one end of the through hole is arranged to open into the annular recessed portion.

Also, the through hole extends along the center axis in the above-described preferred embodiment. Note, however, that the through hole may be arranged to extend at an angle to the center axis in other preferred embodiments. As to the lower end opening of the through hole, it is enough that the lower end opening of the through hole is arranged to open into the gap between the stationary and rotating portions at a level lower than that of the annular recessed portion. For example, the lower end opening of the through hole may be in direct communication with the gap between the outer circumferential surface of the stationary shaft and the inner circumferential surface of the rotating portion, in other preferred embodiments.

Note that, in other preferred embodiments, the lower surface of the lubricating oil may not necessarily be located in the same place as in the above-described preferred embodiment insofar as it is located between the stationary and rotating portions at a level lower than that of the annular recessed portion.

Note that the present invention is also applicable to spindle motors arranged to rotate other types of disks than magnetic disks, such as an optical disk or the like. Note, however, that an application of the present invention to a spindle motor designed for a magnetic disk(s) has great technological significance, because the spindle motor designed for the magnetic disk(s) requires a particularly excellent rotation performance of the bearing apparatus.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A bearing apparatus comprising:
   a stationary member including a stationary shaft arranged along a center axis extending in a vertical direction, and a first annular member being substantially annular in shape and fixed to an outer circumferential surface of the stationary shaft;
   a rotating member supported to be rotatable about the center axis around the stationary shaft; and
   a lubricating oil; wherein
   the rotating member includes:
      a first inner circumferential surface arranged opposite to the outer circumferential surface of the stationary shaft; and
      a second inner circumferential surface arranged opposite to an outer circumferential surface of the first annular member;
   the lubricating oil is arranged in a gap between a surface of the stationary member and the rotating member;
   an upper surface of the lubricating oil is located between the first annular member and the second inner circumferential surface of the rotating member;
   on an upper side of the upper surface of the lubricating oil, the first annular member and the rotating member are arranged radially opposite to each other with a gap defined therebetween to together define a labyrinth seal;
   the labyrinth seal and a fixing range over which the stationary shaft and the first annular member are fixed to each other are arranged to overlap with each other in a radial direction;
   the first annular member includes:
      a circular or substantially circular plate portion arranged to extend radially outward from the stationary shaft; and
      a cylindrical or substantially cylindrical portion arranged to extend downward from a lower surface of an outer edge portion of the circular or substantially circular plate portion; and
   an upper end portion of the first inner circumferential surface of the rotating member is arranged at a level higher than a level of a lower end portion of the cylindrical or substantially cylindrical portion.

2. The bearing apparatus according to claim 1, wherein the first annular member includes an annular projecting portion arranged to extend radially outward from an outer circumferential portion of the circular or substantially circular plate portion.

3. The bearing apparatus according to claim 1, wherein the first annular member is a single continuous monolithic member including:
   a first outer circumferential surface arranged to define the labyrinth seal together with the rotating member; and
   a second outer circumferential surface arranged radially opposite the second inner circumferential surface.

4. The bearing apparatus according to claim 1, wherein the rotating member includes:
   a hub including the first and second inner circumferential surfaces; and
   an annular cap fixed to the hub, and arranged above the upper surface of the lubricating oil; and
   the first annular member and an inner circumferential portion of the cap are arranged to together define the labyrinth seal.

5. The bearing apparatus according to claim 4, wherein the cap includes a bend portion arranged to extend upward or downward to substantially assume a shape of a cylinder in an inner end portion of the cap; and
   the first annular member and an inner circumferential surface of the bend portion are arranged to together define the labyrinth seal.

6. The bearing apparatus according to claim 1, wherein the labyrinth seal is arranged radially inward of the upper surface of the lubricating oil.

7. The bearing apparatus according to claim 1, wherein the labyrinth seal is arranged radially outward of the upper surface of the lubricating oil.

8. The bearing apparatus according to claim 1, wherein the labyrinth seal has an axial dimension equal to or greater than an axial dimension of the fixing range.

9. The bearing apparatus according to claim 1, wherein the fixing range has an axial dimension equal to or greater than an axial dimension of the labyrinth seal.

10. The bearing apparatus according to claim 1, wherein
the stationary member further includes a second annular member arranged to extend radially outward from the stationary shaft on a lower side of the rotating member;
a lower surface of the lubricating oil is located between the rotating member and the second annular member; and
the stationary shaft and the second annular member are defined by a single continuous monolithic member.

11. A spindle motor comprising:
a stationary portion including the stationary shaft and the first annular member of the stationary member of the bearing apparatus of claim 1;
a rotating portion including the rotating member of the bearing apparatus of claim 1 and a support portion arranged to support a disk, and supported to be rotatable with respect to the stationary portion through the bearing apparatus of claim 1; and
a stator and a magnet arranged to produce a torque centered on the center axis between the stationary and rotating portions.

12. The spindle motor according to claim 11, wherein
the rotating member includes an annular upper surface arranged radially outward of the upper surface of the lubricating oil; and
the annular upper surface is arranged at a level lower than that of an upper end surface of the first annular member.

13. A disk drive apparatus comprising:
the spindle motor of claim 11;
a disk supported by the rotating portion of the spindle motor;
a clamper arranged to press the disk against the spindle motor;
an access portion arranged to perform at least one of reading and writing of information from or to the disk; and
a housing arranged to contain the spindle motor and the access portion.

14. The disk drive apparatus according to claim 13, wherein the fixing range, the labyrinth seal, and the clamber are arranged to overlap with one another in a radial direction.

15. A bearing apparatus comprising:
a stationary member including a stationary shaft arranged along a center axis extending in a vertical direction, and a first annular member being substantially annular in shape and fixed to an outer circumferential surface of the stationary shaft;
a rotating member supported to be rotatable about the center axis around the stationary shaft; and
a lubricating oil; wherein
the rotating member includes:
a first inner circumferential surface arranged opposite to the outer circumferential surface of the stationary shaft; and
a second inner circumferential surface arranged opposite to an outer circumferential surface of the first annular member;
the lubricating oil is arranged in a gap between a surface of the stationary member and the rotating member;
an upper surface of the lubricating oil is located between the first annular member and the second inner circumferential surface of the rotating member;
on an upper side of the upper surface of the lubricating oil, the first annular member and the rotating member are arranged radially opposite to each other with a gap defined therebetween to together define a labyrinth seal;
the labyrinth seal and a fixing range over which the stationary shaft and the first annular member are fixed to each other are arranged to overlap with each other in a radial direction; and
the labyrinth seal is arranged radially outward of the upper surface of the lubricating oil.

16. The bearing apparatus according to claim 15, wherein the first annular member includes:
a circular or substantially circular plate portion arranged to extend radially outward from the stationary shaft; and
a cylindrical or substantially cylindrical portion arranged to extend downward from a lower surface of an outer edge portion of the circular or substantially circular plate portion; and
an upper end portion of the first inner circumferential surface of the rotating member is arranged at a level higher than a level of a lower end portion of the cylindrical or substantially cylindrical portion.

17. The bearing apparatus according to claim 15, wherein the first annular member includes an annular projecting portion arranged to extend radially outward from an outer circumferential portion of the circular or substantially circular plate portion.

18. The bearing apparatus according to claim 15, wherein the rotating member includes:
a hub including the first and second inner circumferential surfaces; and
an annular cap fixed to the hub, and arranged above the upper surface of the lubricating oil; and
the first annular member and an inner circumferential portion of the cap are arranged to together define the labyrinth seal; and
the cap includes a bend portion arranged to extend upward or downward to substantially assume a shape of a cylinder in an inner end portion of the cap; and
the first annular member and an inner circumferential surface of the bend portion are arranged to together define the labyrinth seal.

19. The bearing apparatus according to claim 15, wherein the labyrinth seal has an axial dimension equal to or greater than an axial dimension of the fixing range.

20. The bearing apparatus according to claim 15, wherein the fixing range has an axial dimension equal to or greater than an axial dimension of the labyrinth seal.

21. A spindle motor comprising:
a stationary portion including the stationary shaft and the first annular member of the stationary member of the bearing apparatus of claim 15;
a rotating portion including the rotating member of the bearing apparatus of claim 15 and a support portion arranged to support a disk, and supported to be rotatable with respect to the stationary portion through the bearing apparatus of claim 15; and
a stator and a magnet arranged to produce a torque centered on the center axis between the stationary and rotating portions.

22. A disk drive apparatus comprising:
the spindle motor of claim 21;
a disk supported by the rotating portion of the spindle motor;
a clamper arranged to press the disk against the spindle motor;
an access portion arranged to perform at least one of reading and writing of information from or to the disk; and
a housing arranged to contain the spindle motor and the access portion.

23. A bearing apparatus comprising:
a stationary member including a stationary shaft arranged along a center axis extending in a vertical direction, and a first annular member being substantially annular in shape and fixed to an outer circumferential surface of the stationary shaft;
a rotating member supported to be rotatable about the center axis around the stationary shaft; and
a lubricating oil; wherein
the rotating member includes:
   a first inner circumferential surface arranged opposite to the outer circumferential surface of the stationary shaft; and
   a second inner circumferential surface arranged opposite to an outer circumferential surface of the first annular member;
the lubricating oil is arranged in a gap between a surface of the stationary member and the rotating member;
an upper surface of the lubricating oil is located between the first annular member and the second inner circumferential surface of the rotating member;
on an upper side of the upper surface of the lubricating oil, the first annular member and the rotating member are arranged radially opposite to each other with a gap defined therebetween to together define a labyrinth seal;
the labyrinth seal and a fixing range over which the stationary shaft and the first annular member are fixed to each other are arranged to overlap with each other in a radial direction; and
the labyrinth seal has an axial dimension equal to or greater than an axial dimension of the fixing range.

24. The bearing apparatus according to claim 23, wherein the first annular member includes:
   a circular or substantially circular plate portion arranged to extend radially outward from the stationary shaft; and
   a cylindrical or substantially cylindrical portion arranged to extend downward from a lower surface of an outer edge portion of the circular or substantially circular plate portion; and
an upper end portion of the first inner circumferential surface of the rotating member is arranged at a level higher than a level of a lower end portion of the cylindrical or substantially cylindrical portion.

25. The bearing apparatus according to claim 23, wherein the first annular member is a single continuous monolithic member including:
   a first outer circumferential surface arranged to define the labyrinth seal together with the rotating member; and
   a second outer circumferential surface arranged radially opposite the second inner circumferential surface.

26. The bearing apparatus according to claim 23, wherein the rotating member includes:
   a hub including the first and second inner circumferential surfaces; and
   an annular cap fixed to the hub, and arranged above the upper surface of the lubricating oil; and
the first annular member and an inner circumferential portion of the cap are arranged to together define the labyrinth seal.

27. The bearing apparatus according to claim 26, wherein the cap includes a bend portion arranged to extend upward or downward to substantially assume a shape of a cylinder in an inner end portion of the cap; and
the first annular member and an inner circumferential surface of the bend portion are arranged to together define the labyrinth seal.

28. The bearing apparatus according to claim 23, wherein the labyrinth seal is arranged radially inward of the upper surface of the lubricating oil.

29. The bearing apparatus according to claim 23, wherein the labyrinth seal is arranged radially outward of the upper surface of the lubricating oil.

30. A spindle motor comprising:
a stationary portion including the stationary shaft and the first annular member of the stationary member of the bearing apparatus of claim 23;
a rotating portion including the rotating member of the bearing apparatus of claim 23 and a support portion arranged to support a disk, and supported to be rotatable with respect to the stationary portion through the bearing apparatus of claim 23; and
a stator and a magnet arranged to produce a torque centered on the center axis between the stationary and rotating portions.

31. A disk drive apparatus comprising:
the spindle motor of claim 30;
a disk supported by the rotating portion of the spindle motor;
a clamper arranged to press the disk against the spindle motor;
an access portion arranged to perform at least one of reading and writing of information from or to the disk; and
a housing arranged to contain the spindle motor and the access portion.

* * * * *